United States Patent [19]
Fujibayashi et al.

[11] Patent Number: 4,985,726
[45] Date of Patent: Jan. 15, 1991

[54] PHOTOMETRIC DEVICE FOR CAMERA

[75] Inventors: Kazuo Fujibayashi; Shingo Hayakawa; Shuchi Kiyohara, all of Kanagawa, Japan

[73] Assignee: Canon Kabushiki Kaisha, Tokyo, Japan

[21] Appl. No.: 501,432

[22] Filed: Mar. 22, 1990

Related U.S. Application Data

[63] Continuation of Ser. No. 426,488, Oct. 23, 1989, abandoned, which is a continuation of Ser. No. 120,542, Nov. 13, 1987, abandoned.

[30] Foreign Application Priority Data

Nov. 19, 1986 [JP]   Japan .................................. 61-274152
Nov. 25, 1986 [JP]   Japan .................................. 61-278645

[51] Int. Cl.$^5$ ............................ G03B 1/99; G03B 7/20
[52] U.S. Cl. ...................................... 354/432; 354/478
[58] Field of Search ................ 354/432, 455, 478, 286

[56] References Cited

U.S. PATENT DOCUMENTS

| | | | |
|---|---|---|---|
| 4,306,787 | 12/1981 | Fukuhara et al. ................... | 354/432 |
| 4,529,288 | 7/1985 | Nakai et al. ......................... | 354/286 |
| 4,534,639 | 8/1985 | Konishi et al. ................. | 354/478 X |
| 4,571,050 | 2/1986 | Momiyama ..................... | 354/478 X |
| 4,636,054 | 1/1987 | Saegusa ............................. | 354/432 |
| 4,690,536 | 9/1987 | Nakai et al. ...................... | 354/432 X |

Primary Examiner—W. B. Perkey
Attorney, Agent, or Firm—Fitzpatrick, Cella, Harper & Scinto

[57] ABSTRACT

A photometric device for a camera arranged to measure light by dividing a photographing field into a plurality of areas and to permit use of an interchangeable lens. The device computes a measured light value using information obtained from the interchangeable lens on its exit pupil position or on a correction value required for correcting its intrinsic drop of image plane light quantity along with information on each of the luminance values of the plurality of areas.

25 Claims, 16 Drawing Sheets

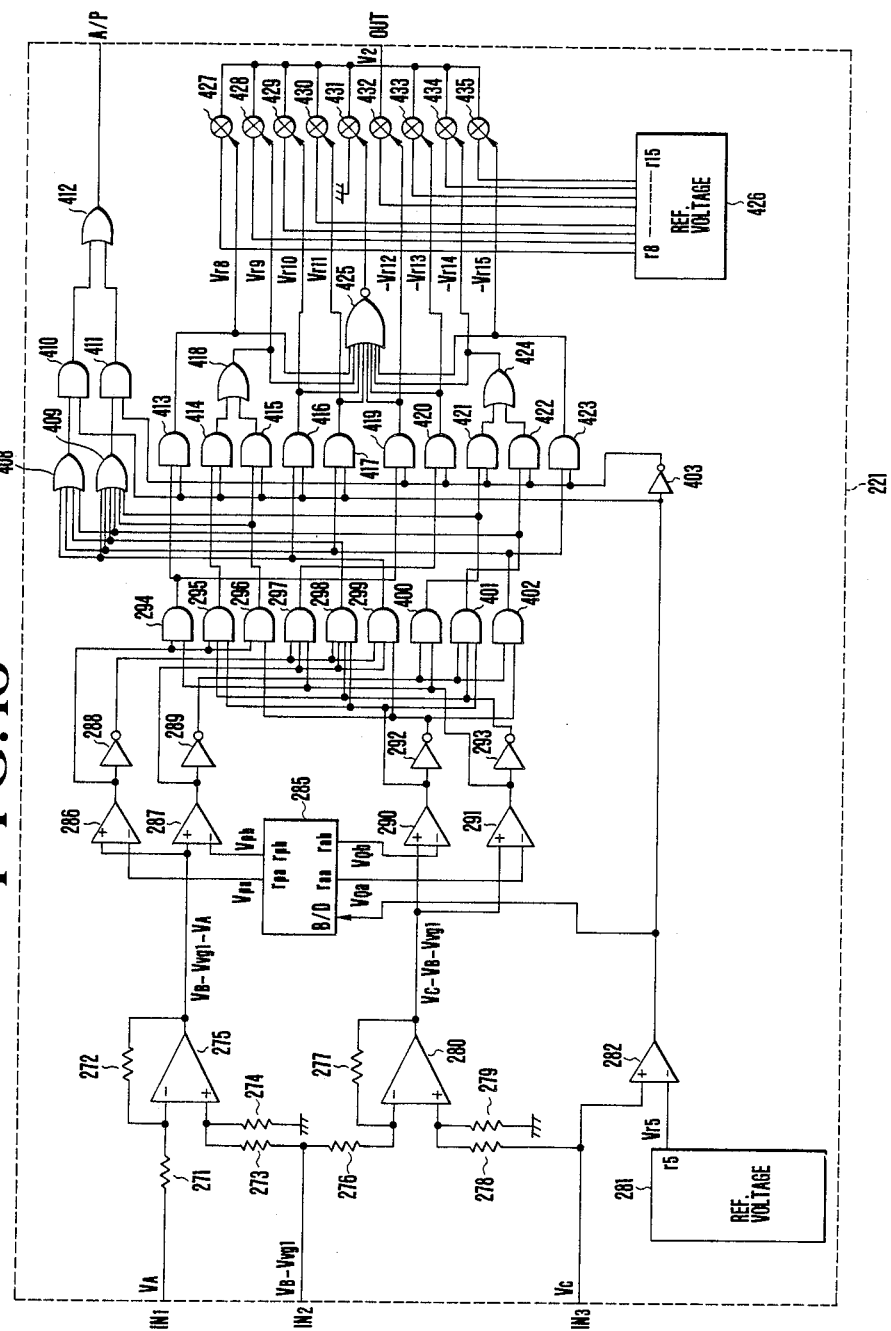
F I G. 16

FIG.19(b)
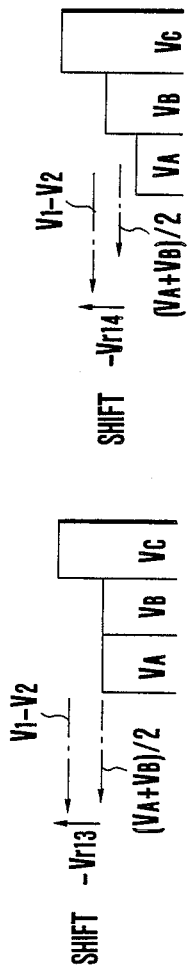
FIG.19(d)
FIG.19(a)
FIG.19(c)

PHOTOMETRIC DEVICE FOR CAMERA

This application is a continuation of application Ser. No. 426,488, filed Oct. 23, 1989, which is a continuation of application Ser. No. 120,542, filed Nov. 13, 1987, both applications now abandoned.

BACKGROUND OF THE INVENTION:

1. Field of the Invention:

This invention relates to a photometric device for a camera of the kind measuring light by dividing a photographing field into a plurality of areas.

2. Description of the Related Art:

The conventional photometric device of the above stated kind which measures light by arranging an image forming lens and a light receiving photosensitive element in the rear of the exit face of a pentagonal prism has an advantage in that the simple structural arrangement of the device readily permits finding a space within the camera for arranging the photometric system thereof without difficulty. However, since the image forming lens (light receiving lens) must be disposed in a position away from the optical axis of a view finder, it is a shortcoming of the device that the device is inferior in the so-called F-number characteristic which indicates a proportional relation between the measured light quantity and the F-number of a photo taking lens. The reason for this shortcoming is as follows:

FIG. 4 of the accompanying drawings shows the optical system arrangement of a single-lens reflex camera having a photometric device of the above stated kind. The illustration includes a focusing screen 1; a pentagonal prism 2; an image forming lens 3; a light receiving element 4; an eyepiece 5; a photo taking lens 6; and a quick return mirror 7. FIG. 5 is a development view showing the photometric optical path and a viewfinder sighting optical path. The illustration of FIG. 5 includes a view finder optical axis O; a view finder sighting optical path K; and a photometric optical path M located in the middle part of the focusing screen 1. Other reference numerals denote the same things as in FIG. 4. As apparent from FIG. 5, the image forming lens 3 and the light receiving element 4 must be arranged in an eccentric position away from the view finder optical axis O for the purpose of saving the sighting optical path K of the view finder from being shaded. As a result, as indicated by a hatched part, light from the photo taking lens 6 obtained at a dark F-number fails to reach the light receiving element 4. Therefore, there arises a problem that a measured light quantity obtained at a dark F-number becomes not proportional to the F-number of the photo taking lens 6.

The relation of the measured light quantity to the F-number is as shown in FIG. 6, wherein: The F-numbers of the photo taking lens 6 are shown on the axis of abscissa. On the axis of the ordinate are shown a number of steps E of the measured light quantity which is arranged on the basis of F/1.4 of the measured light quantity and, which can be expressed as $E = \log_2 Q1 - \log_2 Q0$, wherein Q0 represents the F/1.4 of the measured light quantity and Q1 the measured light quantity obtained at each F number. A line I denotes an ideal F-number proportionality. A broken line curve R denotes the above stated F-number proportionality of the conventional photometric device. As apparent from FIG. 6, in the case of the conventional photometric device, the measured light quantity ceases to be proportional to the F-number for dark F-numbers. Besides, the F-number proportionality of the conventional device is inadequate also for brighter F-numbers, because: The photometric optical system of the conventional device cannot be allowed to have a sufficiently large aperture. Therefore, light at bright F-numbers is not allowed to be completely incident on the the light receiving element 4. In the case of a photometric device of the type arranged to measure the light of the whole field by means of a single sensor, this problem is generally solved by detecting the full-open F-number of the photo taking lens 6 with a signal pin or the like and by correcting the measured light quantity accordingly.

While the conventional photometric device of this kind has the above stated intrinsic problem, the seriousness of the problem is mitigated to a considerable degree in actuality by the diffusing action of the matted surface D of the focusing screen 1. This diffusing action which is as shown in FIG. 7 allows the light obtained at a dark F-number to be incident via the image forming lens 3 upon the light receiving element 4. However, if the photometric device is arranged to have the light receiving element 4 divided into many parts and to measure the light of each of a plurality of areas of the field discretely from other areas, accurate light measurement is hardly possible by mere correction of the F-number.

In case that the light receiving face of the above stated light receiving element 4 is divided into a plurality of areas as shown in FIG. 8 including a center area 4A, a middle or intermediate area 4B which adjoins the center area 4A in a concentric manner and four peripheral areas 4C1, 4C2, 4C3 and 4C4, light measurement outputs obtained with a lens of short focal length and with a lens of long focal length lens at the same F-number differ from each other despite the F-number correction. In the optical arrangement as shown in FIGS. 4 and 5, the light measurement outputs vary to a great degree particularly for the lower part of the photographing image plane, or for the upper part of the image plane in case the light receiving element 4 is arranged as shown in FIG. 9. The upper or lower positional relation obtained on the light receiving face is shown in FIG. 8 as viewed through the view finder. In the case of the arrangement of the light receiving element 4 shown in FIG. 9, the peripheral areas 4C3 and 4C4 are located in the upper part and the peripheral areas 4C1 and 4C2 in the lower part.

FIG. 9 shows the reason why the above stated difference arises. A Fresnel lens is provided on the focusing screen 1 of the single-lens reflex camera for the purpose of imaging the exit pupil on the eye to permit sighting the whole view finder field with sufficient light. This Fresnel lens enables the pupil of the image forming lens 3 to be projected within the area of the exit pupil 3a of the photo taking lens 6 as shown in FIG. 9. Each of the areas 4A to 4C are arranged to measure the light of an area around a corresponding one of the areas 1C1 (1C2), 1A and 1C3 (1C4) of the focusing screen 1 through the image forming lens 3. However, the light flux incident on each of these areas of the element 4 is caused to have light come from the area of the exit pupil 3a of the photo taking lens 6. Some of diffused rays of light from areas other than that of the exit pupil 3a are of course caused to come to each area of the element 4 due to the diffusing property of the focusing screen 1. However, the incident light directly from the area of the exit pupil 3a is received in a dominantly effective amount as measured light quantity. FIG. 9 shows the exit pupil position 6p of the photo taking lens 6 on the assumption that the Fresnel lens of the focusing screen 1 is in the optimum position thereof. In the event of a photo taking lens such as a wide-angle lens or the like that has an exit pupil position nearer to the focusing screen 1, for example, as indicated by a broken line, the direct incident light on the area 4C3 or 4C4 coming through the area 1C3 or 1C4 of the focusing screen 1 tends to be eclipsed. Therefore, when a lens having the exit pupil closer to the focusing screen 1, such as a wide-angle lens is mounted on the camera, the measured light quantity becomes inaccurate for the lower area of the image plane.

Meanwhile, there have been proposed many photometric devices of the kind arranged to divide the photographing field into a plurality of areas, to discretely measure light for each of these areas and to make an apposite exposure of the photographing image plane on the basis of the plurality of measured light values thus obtained. For example, the applicant of the present application has previously filed U.S. patent applications Ser. Nos. 513,153, 515,360, 563,462, 894,613, 009,995 and 043,935 for photometric devices of this kind.

The photometric devices of this kind measure the luminance of each of the divided area of the photographing field and perform a computing operation according to conditions for an apposite exposure selected from the plurality of photometric outputs thus obtained. Therefore, the device of this kind is required first of all to accurately measure the luminance of each area. However, in the event of a camera permitting use of interchangeable photo taking lenses, the degree of a light quantity drop which takes place in the peripheral part of the image plane greatly varies with the lens to be used. For example, expressing this on the basis of a full-open or maximum F-number, it varies up to a degree corresponding to two steps. Therefore, in the case of some lens, it is impossible to make accurate light measurement with the lens opened to the maximum aperture thereof and this eventually gives an erroneous result of the computing operation.

Further, a concept of correcting the above stated light quantity drop which takes place in the peripheral part of the image plane has been proposed in a U.S. Pat. No. 4,306,787 (Re 32376). The method employed in this concept, however, necessitates the camera to store therein some correction value information based on such lens information as F-number. This method presents no problem as long as the lens is selected from a group of anticipated interchangeable lenses. However, it presents a problem in cases where some special interchangeable lens is to be included in the interchangeable lens group. In other words, in designing the camera, the correction information can be completely stored at a ROM or the like for all the known intended interchangeable lens. However, it is impossible to cover an interchangeable lens newly designed after designing and marketing of the camera with known correction value information stored therein. Further, an interchangeable lens group generally includes about 30 lenses. Therefore, in cases where the correction information about every one of 30 lenses is to be stored by means of a ROM or the like, there arises a problem in terms of memory capacity.

SUMMARY OF THE INVENTION:

It is an object of this invention to provide a photometric device for a camera of the kind measuring light by dividing a photographing field into a plurality of areas, with the device being arranged to be capable of always accurately performing light measurement irrespectively of the kind of the interchangeable lens which is mounted on the camera.

The above and other objects and features of the invention will become apparent from the following detailed description of embodiments thereof taken in conjunction with the accompanying drawings.

BRIEF DESCRIPTION OF THE DRAWINGS:

FIG. 16 is a circuit diagram showing by way of example the arrangement of a selection circuit included in FIG. 13.

FIGS. 17(a)–17(i), 18(a), 18(b) and 19(a)–19(i) illustrate computing formulas to be used in obtaining light measurement values under varied luminance conditions of the photographing field.

Figure 1:
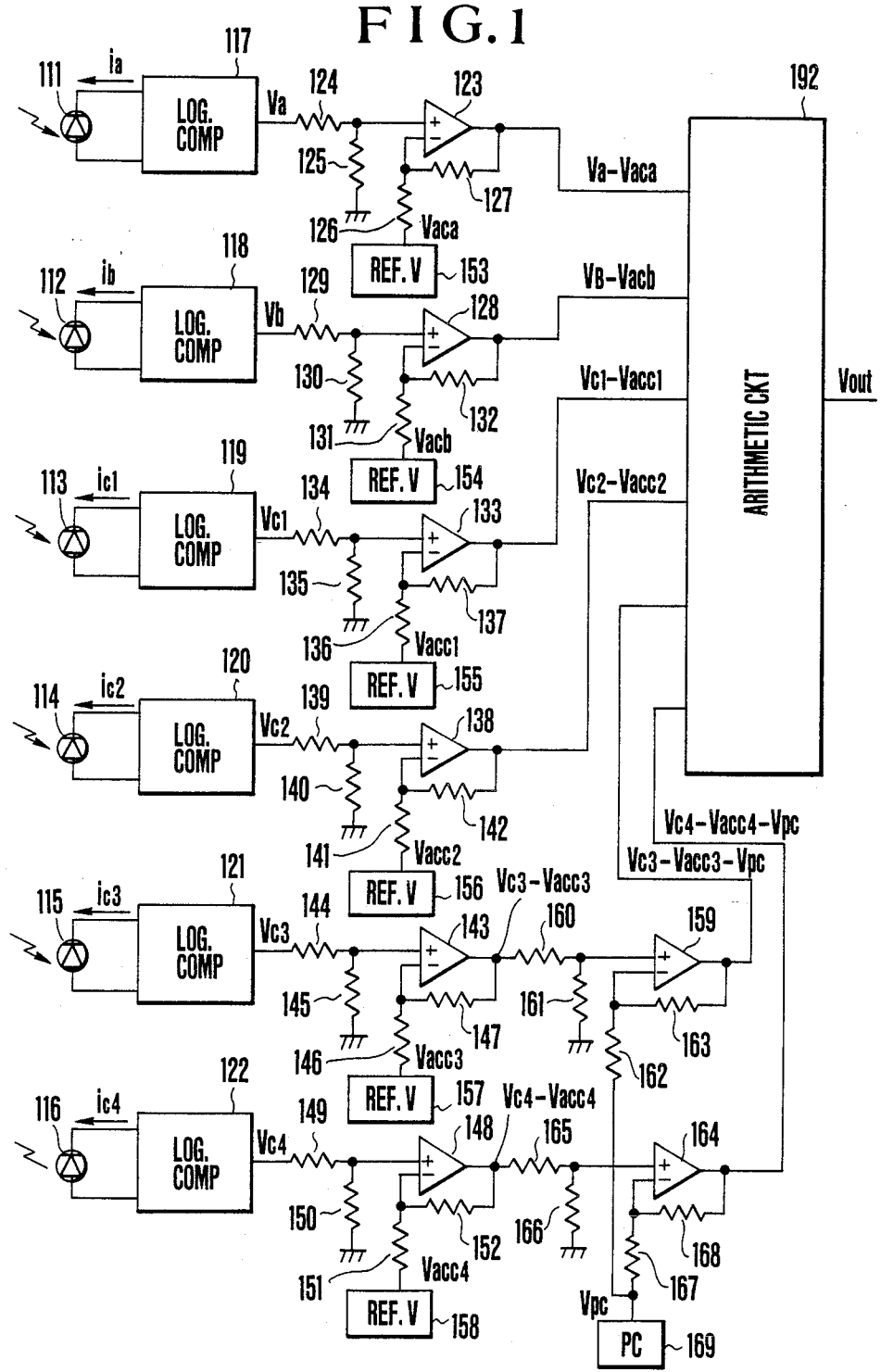
FIG. 1 is a circuit diagram showing a first embodiment of this invention.

DETAILED DESCRIPTION OF THE PREFERRED EMBODIMENTS:

The details of preferred embodiments of this invention will be understood from the following description given with reference to the accompanying drawings:

FIG. 1 shows in a circuit diagram the arrangement of a first embodiment of this invention. In FIG. 1, the divided areas 4A, 4B and 4C1 to 4C4 are indicated, for convenience' sake, as discrete light receiving elements 111 to 116 which are equivalently arranged independently of each other. These light receiving elements 111 to 116 are arranged to generate photo currents ia, ib and ic1 to ic4 which are proportional to the illuminance of the light receiving face. Logarithmic compression circuits 117 to 122 are arranged to produce voltage value signals Va, Vb and Vc1 to Vc4 by logarithmically compressing the photo currents ia, ib and ic1 to ic4 respectively. Reference numerals 123, 128, 133, 138, 143 and 148 denote operational amplifiers (hereinafter referred to as ope amp's). The op amp 123 is arranged to form a subtraction circuit in conjunction with resistors 124 to 127 which are of equal resistance values. The op amp 128 forms a subtraction circuit in conjunction with resistors 129 to 132 which are of equal resistance values. The op amp 133 forms a subtraction circuit in conjunction with resistors 134 to 137 which are of equal resistance values. The op amp 138 forms a subtraction circuit in conjunction with resistors 139 to 142 which are of equal resistance values. The op amp 143 forms a subtraction circuit in conjunction with resistors 144 to 147 which are of equal resistance values. The op amp 148 also forms another subtraction circuit in conjunction with resistors 149 to 152 which are of equal resistance values.

Reference voltage generating circuits 153 to 158 are arranged to supply the above stated subtraction circuits with reference voltages Vaca, Vacb and Vacc1 to Vacc4 which represent correction values for luminance values coming from the light receiving elements 111 to 116 and correspond to the maximum F-number values of the photo taking lenses that can be mounted on the camera. The subtraction circuits then produce voltage values Va−Vaca, Vb−Vacb, Vc1−Vacc1, Vc2−Vacc2, Vc3−Vacc3 and Vc4−Vacc4 respectively. Numerals 159 and 164 denote op amp's. The op amp 159 is arranged to form a subtraction circuit jointly with resistors 160 to 163 which are of equal resistance values. The other op amp 164 forms a subtraction circuit jointly with resistors 165 to 168 which are of equal resistance values. A reference voltage generating circuit 169 is arranged to produce a reference voltage Vpc which corresponds to a correction value for measured light outputs of the light receiving elements 115 and 116 located in lower parts of the image plane corresponding to the pupil position of the photo taking lens mounted on the camera. The reference voltage Vpc thus produced is supplied to each of the above stated subtraction circuits. The subtraction circuits then produce voltage values which can be expressed as Vc3−Vacc3−Vpc and Vc4−Vacc4−Vpc. An arithmetic circuit 192 is arranged to produce on the basis of the voltage coming from each of the subtraction circuits a measured light value which results in an apposite exposure of the surface of film.

Figure 2:
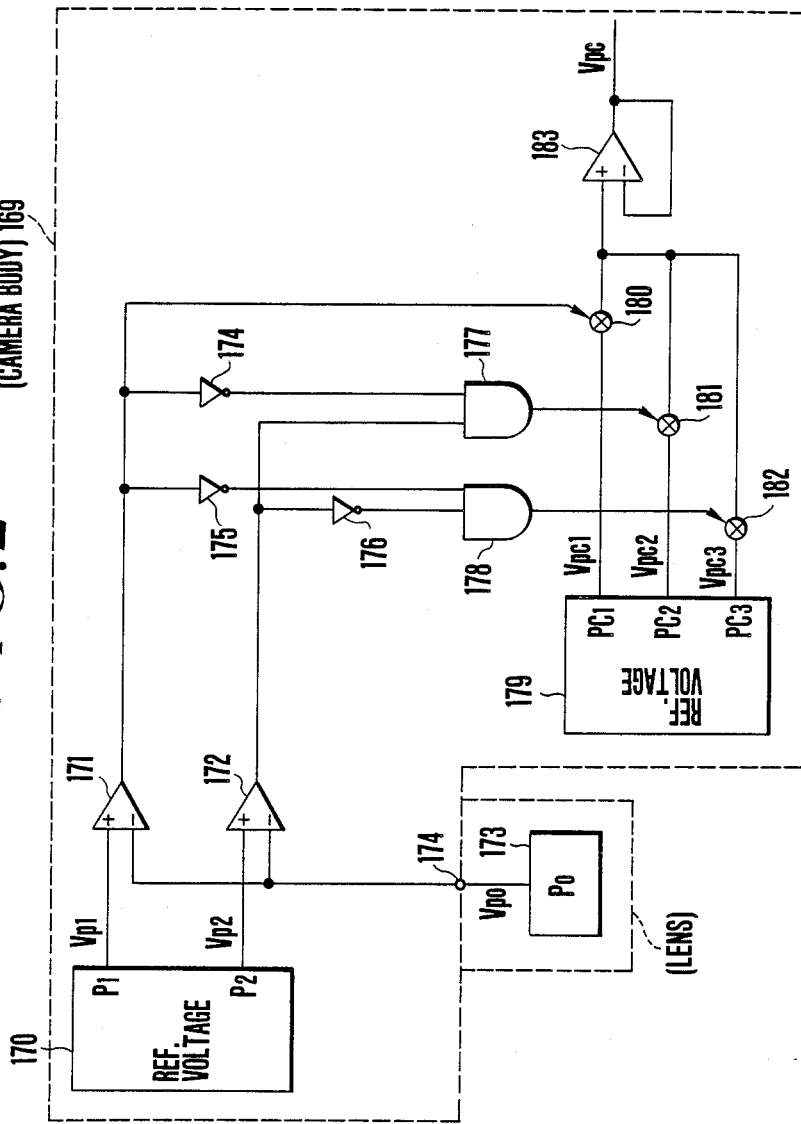
FIG. 2 is a circuit diagram showing by way of example the details of arrangement of a reference voltage generating circuit which is included in FIG. 1 and is arranged to produce information on a correction value required for the exit pupil position of a photo taking lens.

FIG. 2 shows by way of example the arrangement of the above stated reference voltage generating circuit 169. Referring to FIG. 2, the circuit 169 includes: A reference voltage generator 170 which is arranged to produce from its output terminals P1 and P2 reference voltages Vp1 and Vp2 which are in a relation of Vp1>Vp2; comparators 171 and 172; and a reference voltage generator 173 which is disposed within a lens barrel mounted on the camera and is arranged to produce from its output terminal Po, via a node 174, a reference voltage Vp0 to the negative phase input terminals of the comparators 171 and 172. The output level of each of the comparators 171 and 172 becomes high in the case of Vp0>Vp1. The output level of the comparator 171 becomes low and that of the comparator 172 high in the case of Vp1>Vp0>Vp2. The output levels of the comparators 171 and 172 both become low in the event of Vp2>Vp0. The circuit 169 further includes inverters 174, 175 and 176; and AND gates 177 and 178.

Numerals 180, 181 and 182 denote analog switches. When the comparators 171 and 172 produce high level outputs, the output levels of all the inverters 174, 175 and 176 become low and those of the AND gates 177 and 178 also become low. As a result, among the analog switches 180 to 182, the analog switch 180 alone becomes conductive. When the comparator 171 produces a low level output and the comparator 172 a high level output, the inverters 174 and 175 produce high level outputs and the inverter 176 a low level output. Therefore, the output level of the AND gate 177 becomes high. As a result, the analog switch 181 alone becomes conductive. Further, when the comparators 171 and 172 produce low level outputs, the output levels of all the inverters 174 to 176 become high and the output level of the AND gate 178 also becomes high. Then, the analog switch 182 alone becomes conductive.

A reference voltage generator 179 is arranged to produce reference voltages Vp1, Vp2 and Vp3 from its output terminals PC1, PC2 and PC3. An op amp 183 is arranged to serve as a voltage follower and has its output terminal connected to its negative phase input terminal. The ope amp 183 thus produces a voltage which is equal to an input voltage received at its positive phase input terminal irrespectively of the states of ensuing circuit elements. The op amp 183 selectively produces, as its output voltage Vpc, one of the reference voltages Vpc1, Vpc2 and Vpc3. More specifically, the op amp 183 produces as its output voltage Vpc by selecting the reference voltage Vpc1 in the case of Vp0>Vp1 as the analog switch 180 then alone becomes conductive, the reference voltage Vpc2 in the case of Vp1>Vp0>Vp2 as the analog switch 181 then alone becomes conductive, or another reference voltage Vpc3 in the case of Vp0<Vp2 as the analog switch 182 then alone becomes conductive. In other words, an apposite correction value is selected according to the pupil position of the photo taking lens mounted on the camera.

Figure 3:
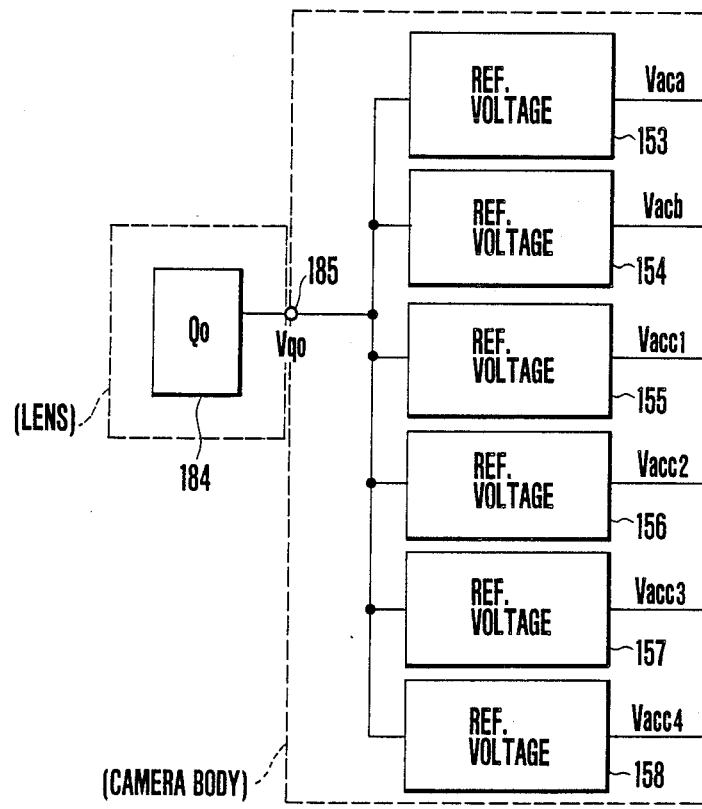
FIG. 3 shows the reference voltage generating circuit of FIG. 1 arranged to produce information on a measured light output correction value corresponding to the maximum (or full-open) F-number of the photo taking lens.

FIG. 3 sows the arrangement of the reference voltage generating circuits 153 to 158 which are arranged to generate the reference voltages Vaca, Vacb and Vacc1 to Vacc4 as shown in FIG. 1. A reference voltage generator 184 which is disposed within the lens barrel produces via a node 185 a reference voltage Vq0 representing the maximum F-number value of the lens. The voltage Vq0 is supplied to the reference voltage generating circuits 153 to 158. Each of the circuits 153 to 158 is arranged in a manner similar to the arrangement of the reference voltage generating circuit 169 shown in FIG. 2. The arrangement of them is as follows: The level of the input reference voltage Vq0 is first detected. One of preset reference voltage values is selected according to the level detected. Then, one of the above stated reference voltages Vaca, Vacb and Vacc1 to Vacc4, i.e. a light measurement output correction value determined by the maximum F-number of the lens, is produced via the op amp which is arranged as a voltage follower for each of the light receiving elements 111 to 116.

Figure 8:
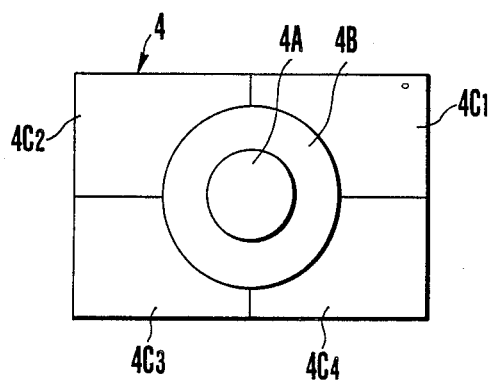
FIG. 8 shows the light receiving face of a light receiving element.

Each of the circuits described above is arranged to receive, within the camera body, the information on the maximum F-number and information on the exit pupil position stored within the lens assumably mounted on the camera for the purpose of correcting a non-linear relation existing between the incident light quantity and the measured light quantity in the photometric system of the camera. Upon receipt of the information, one of correction values preset within the camera body for photometric correction and exit pupil position correction corresponding to the maximum F-numbers is selected. The circuit then adds the selected correction value to the actual photometric outputs Va to Vc. Such being the circuit arrangement, luminance measurement can be accurately performed for each of the divided areas which are as shown in FIG. 8 (light receiving elements 111 to 116).

The six different output voltages Va−Vaca, Vb−Vacb, Vc1−Vacc1, Vc2−Vacc2, Vc3−Vacc3−Vpc and Vc4−Vacc4−Vpc are supplied to the arithmetic circuit 192 of FIG. 1. The circuit 192 then performs a computing operation in a suitable method to produce a voltage Vout as the output thereof. The computing method to be employed for the arithmetic circuit 192 is selected, for example, from among varied methods including: A method of obtaining an average of the six output voltages; and a method in which, when a stepped difference between the photometric output of the peripheral part and that of the middle part exceeds a given level, the photographing object is regarded as in a state of having a rear light and then an exposure correcting value is added to the measured light value. In order to fully attain the advantageous effect of the computing operation, the input value to be supplied to the circuit 192 must be accurate. Whereas, the arrangement to correct the measured light value on the basis of the above stated lens information greatly contributes to the accurate result of the computing operation.

In the case of this embodiment, the photometric system is disposed behind the exit face of a pentagonal prism in an eccentric position deviating from the optical axis of the view finder. In case that a lens having an exit pupil position close to a focusing screen is mounted on the camera with the device arranged to receive light diffused by the focusing screen, it has been impossible to make accurate light measurement as the measured light quantity obtained on the image plane decreases at parts located in the direction opposite to the eccentric or deviating direction of the photometric system. Whereas, the embodiment is capable of performing always accurate light measurement irrespectively of the kind of lens mounted by virtue of the arrangement to make photometric correction by obtaining information on the specific exit pupil position of the lens.

Further, in the optical arrangement of the photometric system of the embodiment, the focusing screen and the light receiving elements can be arranged in a conjugate relation. This permits light measurement by dividing the photographing field into a plurality of areas and photometric correction of each of the divided areas of the field independently of another.

In this embodiment, the light receiving elements 111 to 116 correspond to light receiving means; the reference voltage generating circuit 169 to correction value information generating means; the resistors 124 to 168 to luminance information correcting means; and the arithmetic circuit 192 to computing means, respectively.

While the invention is applied to a single-lens reflex camera using an interchangeable lens in the case of this embodiment, the invention is likewise applicable also to a camera of the kind using zoom lenses which have recently become very popular. In the case of a zoom lens, the exit pupil position varies with the zooming position. Further, in the case of a zoom lens arranged in a compact size, the lens is often arranged to have a variable maximum F-number value. In the event of a zoom lens of the latter type, luminance can be always accurately measured despite of any change in the focal length the lens by arranging information on the maximum F-number value and the exit pupil position to be transmissible to the camera body.

It is a general practice these days that the information on the exit pupil position is arranged to be obtained from the lens side. However, this arrangement may be replaced with a method in which, for example, the exit pupil position is detected by means of a signal pin or the like disposed on the side of the lens; and then information on a required correction value is computed on the side of the camera body. While the embodiment is arranged to divide the photographing field into six areas and to receive light from the six areas by dividing the light receiving face also into six parts or areas accordingly. That arrangement, however, may be changed to divide the light receiving face only into a middle and peripheral parts. However, it goes without saying that the arrangement to further divide the peripheral part with the subdivided peripheral parts located at least in the upper and lower parts of the image plane, as in the case of this embodiment, gives a more accurately measured light value.

The first embodiment of this invention, as described in the foregoing, comprises the correction value information generating means for generating information on the correcting value for the exit pupil position information transmitted from the photo taking lens; and luminance information correcting means which is arranged to correct the luminance information from the light receiving means according to the correction value information from the above stated correction value information generating means. The first embodiment is thus arranged to be capable of always performing accurate light measurement irrespectively of variations in the exit pupil position of the photo taking lens by virtue of the arrangement made to correct any eclipsing portion of the incident light due to a change in the exit pupil position of the lens.

Figure 4:
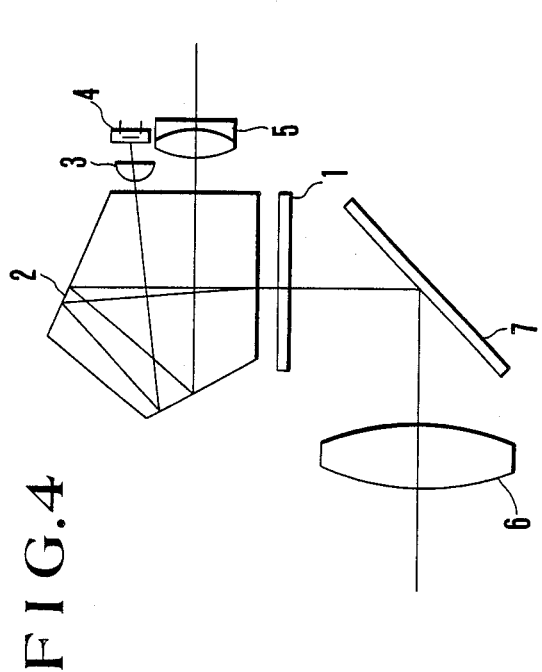
FIG. 4 is an illustration of arrangement of a photometric optical system generally employed in a single-lens reflex camera.
Figure 5:
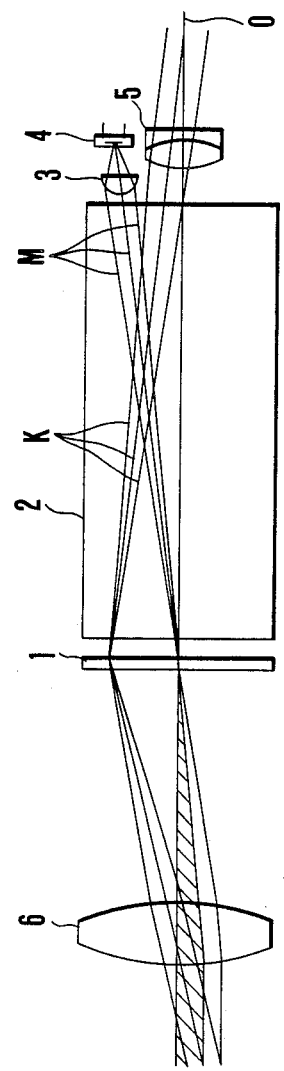
FIG. 5 is a development view showing the photometric optical path and the view finder sighting optical path of the photometric optical system of FIG. 4.
Figure 6:
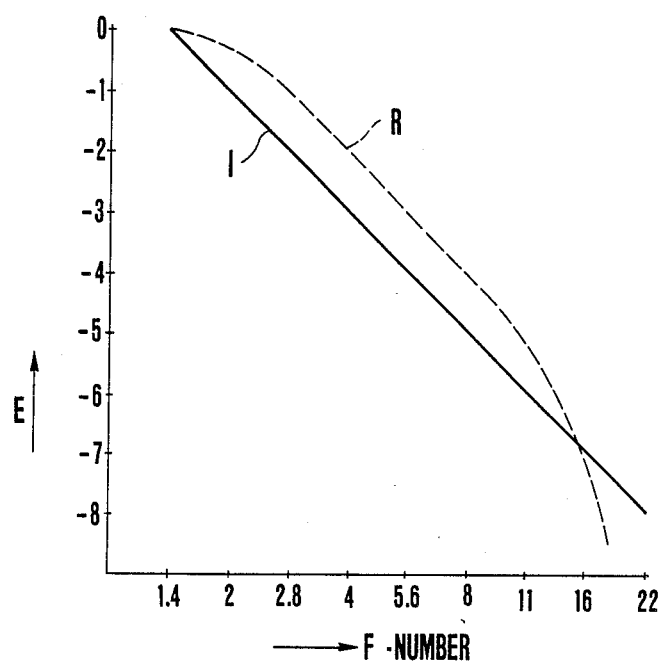
FIG. 6 is a graph showing the relation of measured light quantity to ideal F-numbers and to the F-numbers obtained by the conventional photometric device.
Figure 7:
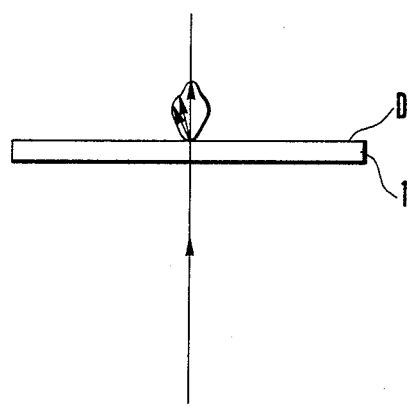
FIG. 7 shows the diffusing action of the matted face of a focusing screen.
Figure 10:
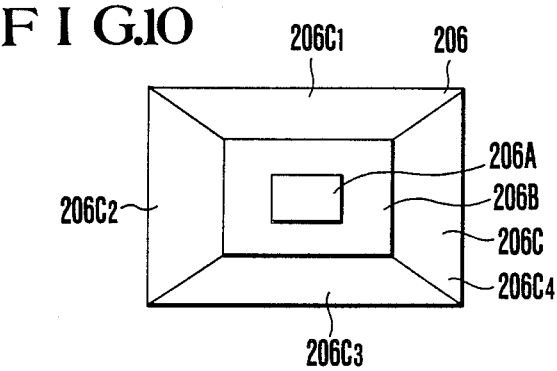
FIG. 10 shows the light receiving face of a light receiving element employed in a second embodiment of this invention.

A second embodiment of this invention is arranged as described below with reference to FIGS. 10 to 19(i):

FIG. 10 shows the light receiving face of a light receiving element 206 which is positioned as shown in FIG. 4. An area 206A is arranged to measure the luminance of the middle part of the photographing field. An area 206B is arranged to measure the luminance of a peripheral part around the middle part. An area 206C is arranged to measure the luminance of a further peripheral part. The area 206C is subdivided into four smaller areas 206C1 to 206C4. The photometric system of the second embodiment which is arranged in this manner is of the type called an evaluative photometric system whereby a scene discrimination is made by multi-division light measurement. For example, in photographing a so-called back-light scene, such as a person with the setting sun in the rear of him, the conventional camera has a measured light value governed by the bright background to give an under exposure for the main object. Whereas, in the case of the multi-division light measurement, the light of the middle part can be measured separately from the peripheral part. Therefore, any difference in luminance between the middle part and the peripheral part of the photographing field is detectable to distinguish such back-light scenes. The embodiment is, therefore, capable of appositely correcting an exposure according to the degree of a back-light condition. In addition to that, the embodiment is capable of making a discrimination between a normal light scene, a high light scene and a shadow scene, etc. for an apposite exposure.

Figure 11:
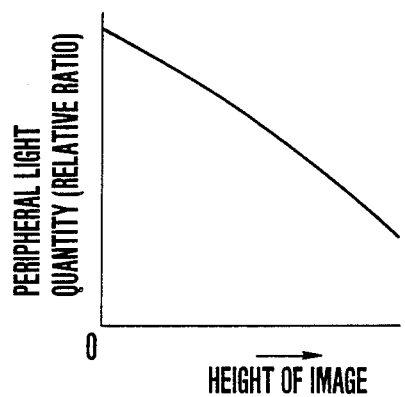
FIG. 11 shows by way of example the drop of light quantity brought about on an image plane by a photo taking lens.
Figure 9:
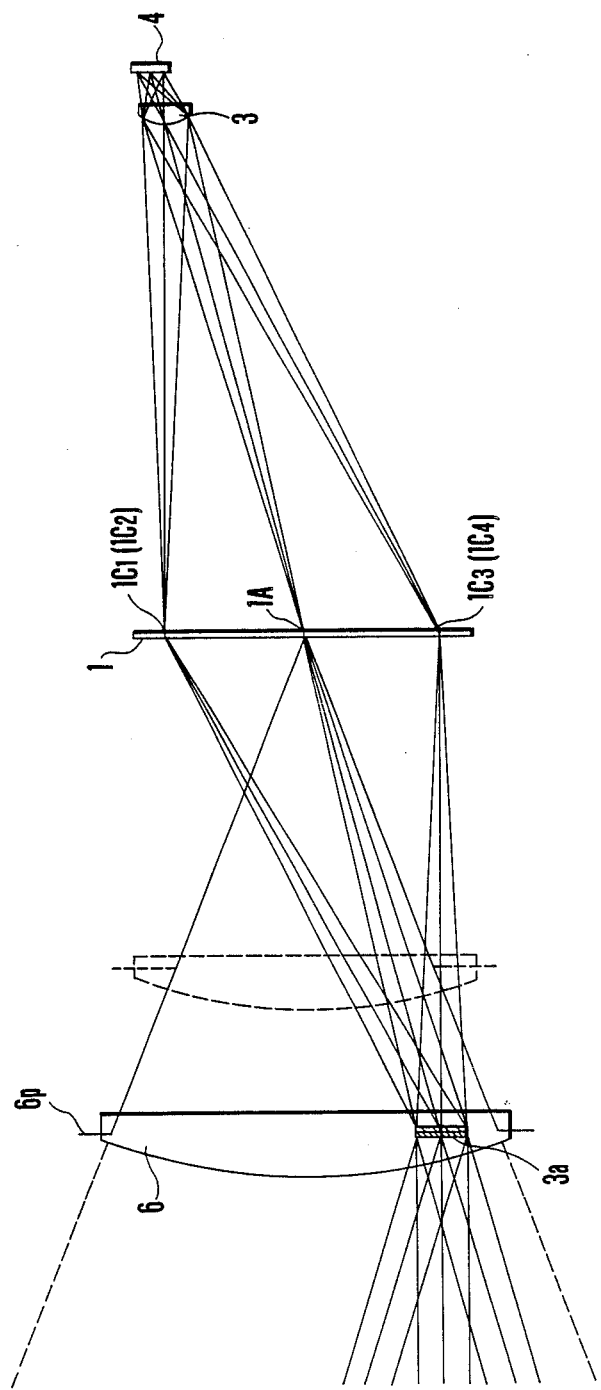
FIG. 9 shows variations taking place in light measurement outputs according as the position of an exit pupil varies.

Meanwhile, in the case of a single-lens reflex camera, the photo taking lens is interchangeable. Therefore, an apposite exposure value obtained for a standard lens by computing a light value measured by each of the divided areas comes to have an error when the lens is replaced with another lens, because: As mentioned in the foregoing, the degree to which the image light quantity decreases in the peripheral part of the image plane varies with the change of one lens to another. In other words, the drop in the image light quantity causes the photometric values of the light receiving parts 206A, 206B and 206C1 to 206C4 to vary every time the use of one lens is changed to another to bring about some error in the result of computation. FIG. 11 shows by way of example the degree of the drop in in the image plane light quantity.

Figure 12:
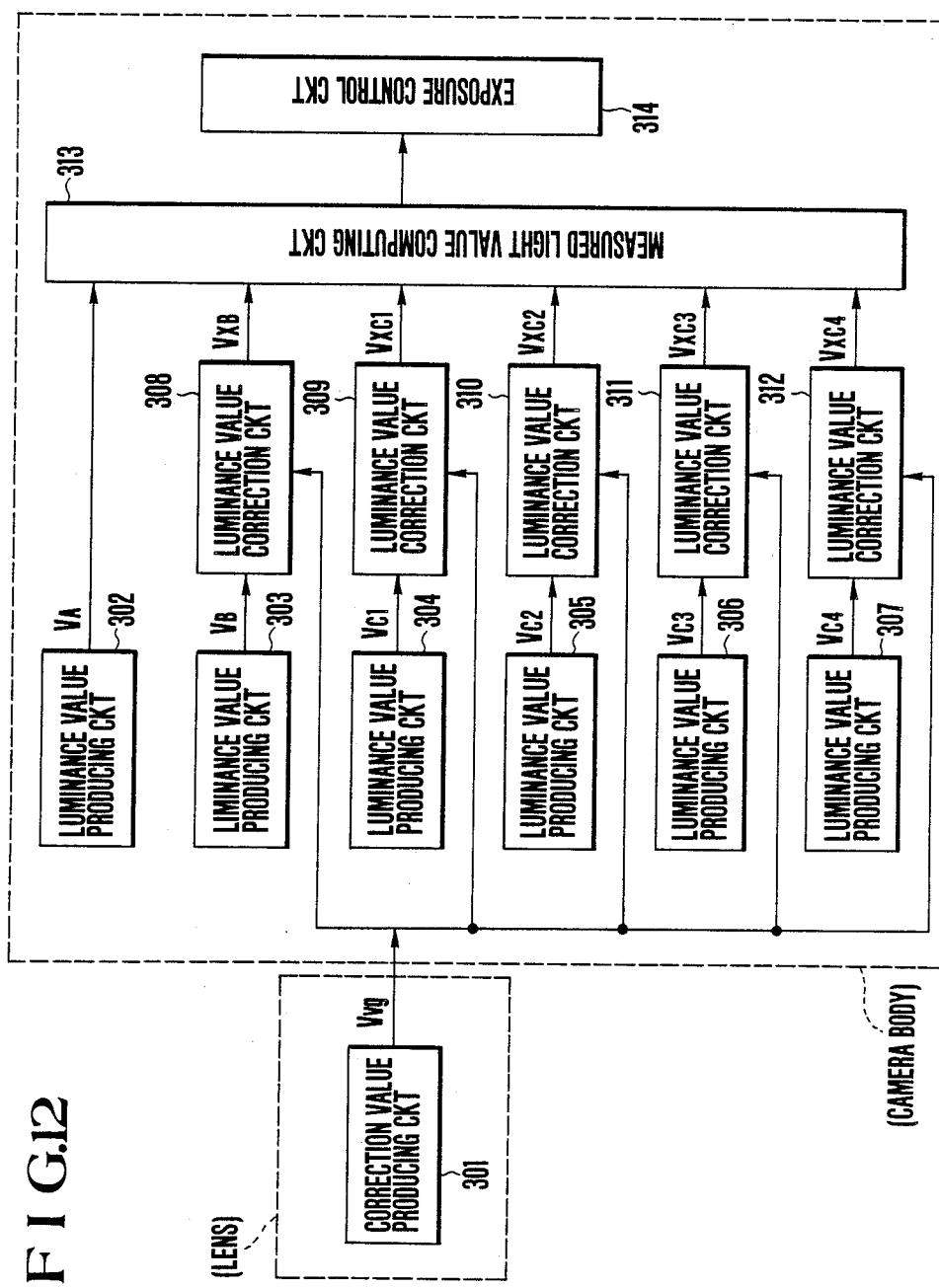
FIG. 12 is a block diagram showing in outline an example of the arrangement of a signal processing system to be employed by the second embodiment of the invention.

FIG. 12 is a block diagram showing in outline the signal processing arrangement of the second embodiment for correcting the above stated light measurement error. A correction value producing circuit 301 is disposed within every interchangeable lens to produce a correction value Vvg necessary for correcting the degree of drop in the image light quantity (light quantity on the image plane) which results from the use of this specific lens. Luminance value producing circuits 302 to 307 are arranged to produce voltages VA, VB and VC1 to VC4 which correspond to luminance values measured by the light receiving parts 206A, 206B and 206C1 to 206C4 of the above stated light receiving element 206. In FIG. 12, the divided areas of the light receiving face of the element 206 are represented by these light receiving parts which are equivalently arranged as independent light receiving elements. Luminance value correction circuits 308 to 312 are arranged to produce corrected luminance values VXB and VXC1 to VXC4 which are obtained by correcting the outputs of the circuits 303 to 307 with the above stated correction value Vvg produced from the correction value producing circuit 301. A reference numeral 313 denotes a measured light value computing circuit. A numeral 314 denotes an exposure control circuit. With the signal processing circuit arranged in this manner, the embodiment is capable of obtaining a luminance value, i.e. a measured light value, which is obtained from each area and corrected according to the information on the correction value Vvg of a newly mounted lens every time one lens is replaced with another. The second embodiment is thus arranged to be capable of preventing any photometric error due to a change of one lens for another.

Figure 13:
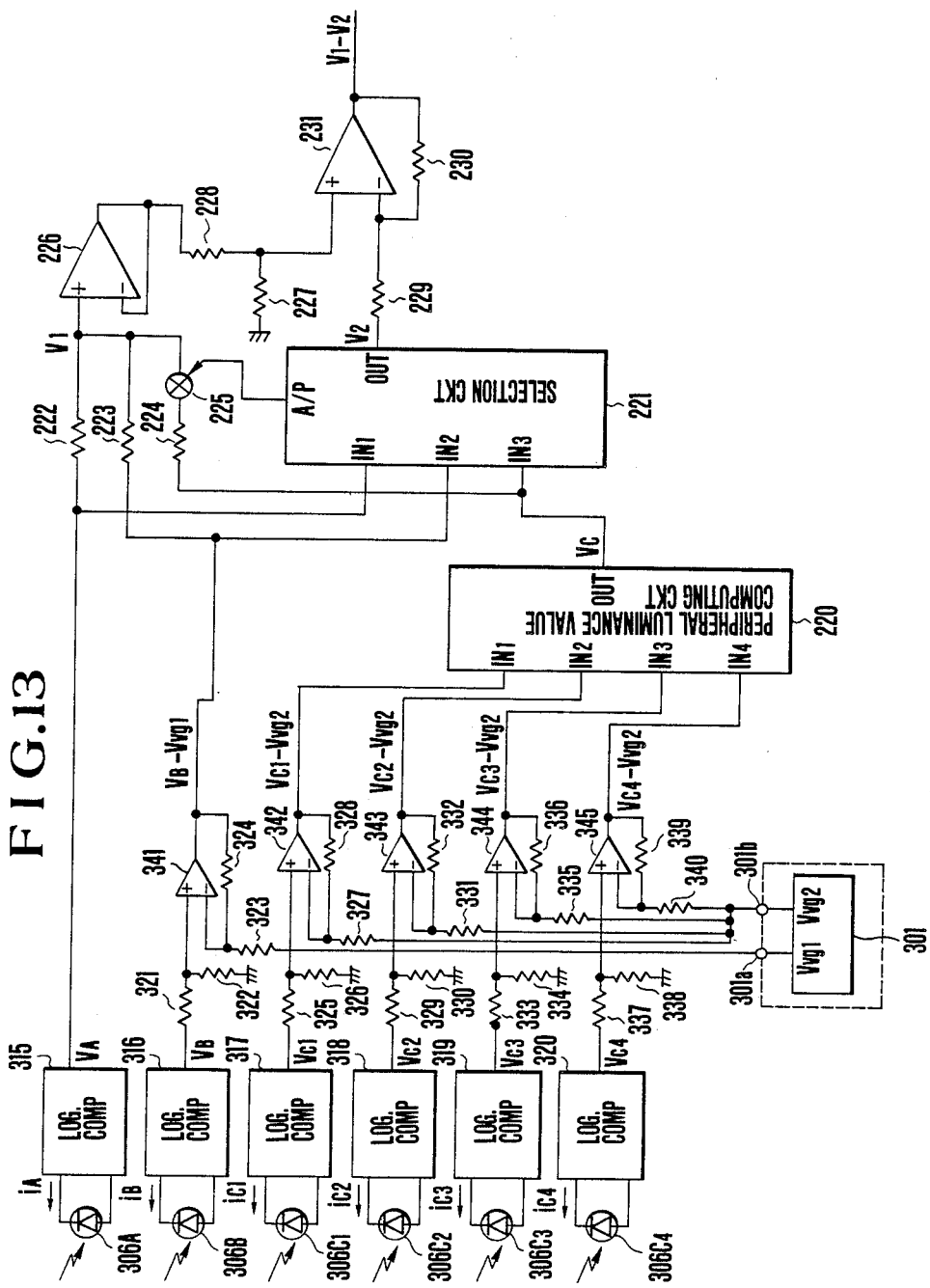
FIG. 13 is a circuit diagram showing the arrangement of various circuit elements included in FIG. 12.

FIGS. 13 to 16 show the details of the circuit arrangement of FIG. 12. Referring first to FIG. 13, logarithmic compression circuits 315 to 320 are arranged to logarithmically compress photo currents iA, iB and iC1 to iC4 generated by the light receiving areas or parts 206A, 206B and 206C1 to 206C4 of the light receiving element 206. The logarithmically compressed photo currents are then produced as signal voltages VA, VB and VC1 to VC4. Using constants a1 to a6 ($\geq 0$) and b ($\geq 0$) and the photo currents iA, iB and iC1 to iC4, these voltages VA, VB and VC1 to VC4 can be expressed as follows:

$$VA = a1 + b\ln iA \quad VB = a2 + b\ln iB$$
$$VC1 = a3 + b\ln iC1 \quad VC2 = a4 + b\ln iC2$$
$$VC3 = a5 + b\ln iC3 \quad VC4 = a6 + b\ln iC4$$

In the above formulas, a1 to a6 are assumed to be preset within the above stated logarithmic compression circuits 315 to 320 in such a way as to obtain a relation of $VA=VB=VC1=VC2=VC3=VC4$ when a standard lens is mounted on the camera and the luminance values of the areas of the photographing field corresponding to the light receiving parts are equal to each other. The correction value producing circuit 101 which is disposed on the side of the lens, i.e. within the lens barrel, is arranged to produce, via nodes 301a and 301b, two different reference voltages Vvg1 and Vvg2 which represent correction values required for the specific lens.

The illustration of FIG. 13 includes resistors 321 to 340 which have equal resistance values; and ope amp's 341 to 345. Subtraction circuits are formed jointly by the resistors 321 to 324 and the op amp 341, jointly by the resistors 325 to 328 and the op amp 342, jointly by the resistors 329 to 332 and the op amp 343, jointly by the resistors 333 to 336 and the op amp 344 and jointly by the resistors 337 to 340 and the op amp 345 respectively. The subtraction circuits are arranged to produce voltages VB−Vvg1, VC1−Vvg2, VC2−Vvg2, VC3−Vvg2 and VC4−Vvg2 respectively. In the following description, the voltage output values VB−Vvg1 will be referred to as Vb.

A peripheral luminance value computing circuit 220 is arranged to receive the corrected voltages VC1−Vvg2, VC2−Vvg2, VC3−Vvg2 and VC4−Vvg2 which are produced from the above stated logarithmic compression circuits 317 to 320 and come via the subtraction circuits to the input terminals IN1 to IN4 of the circuit 220. The circuit 220 is arranged to compute the luminance values of the outermost peripheral areas 206C1 to 206C4 of the field and to produce from its output terminal OUT a voltage Vc which is obtained as the result of the computation.

Figure 14:
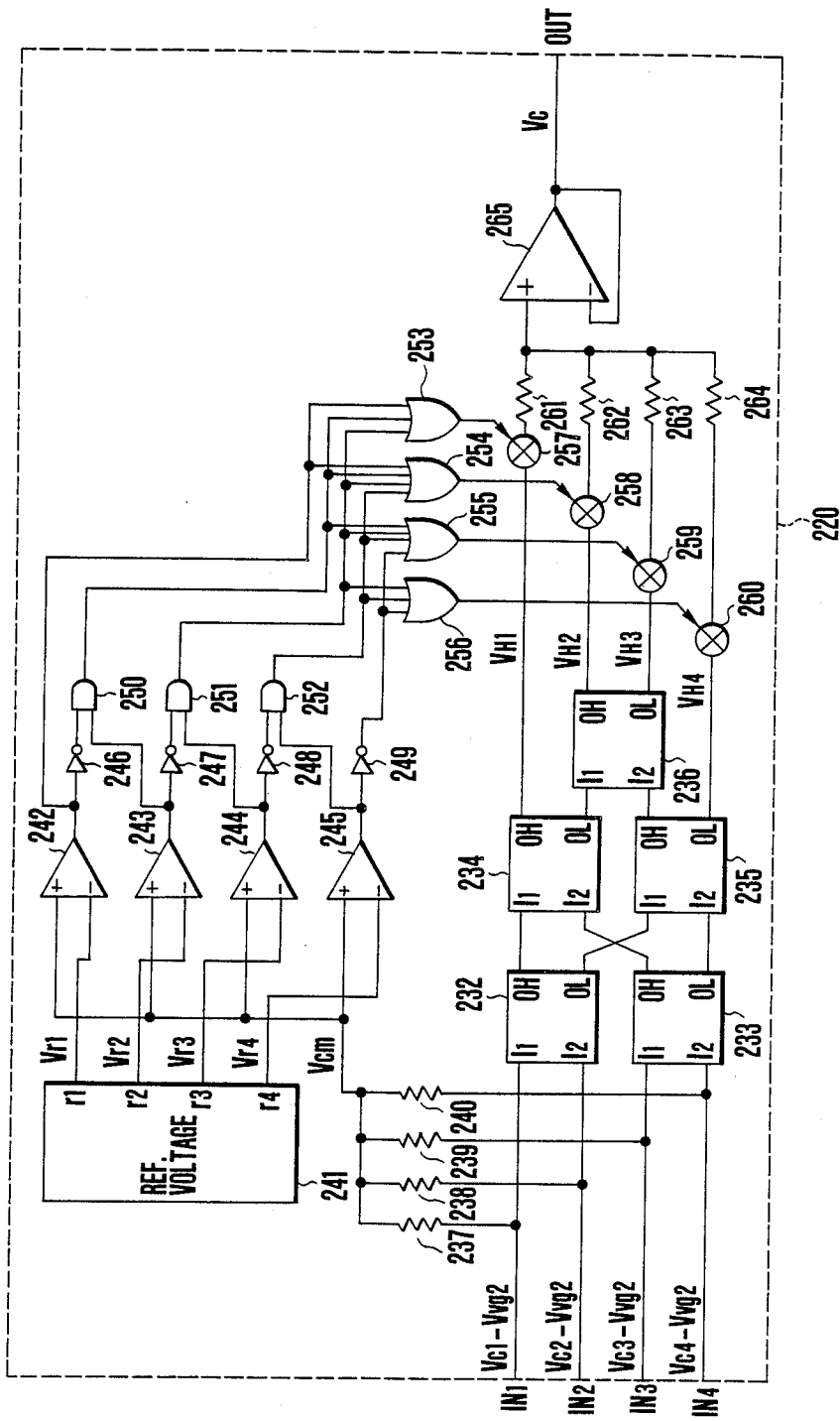
FIG. 14 is a circuit diagram showing by way of example the details of a peripheral luminance computing circuit included in FIG. 13.
Figure 15:
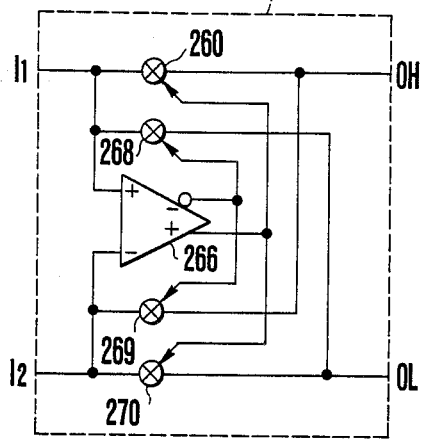
FIG. 15 is a circuit diagram showing the details of a size comparison circuit included in FIG. 14.

The details of the peripheral luminance value computing circuit 220 are as shown in FIG. 14. The circuit 220 includes magnitude comparison circuits 232, 233, 234, 235 and 236. Each of these comparison circuits is arranged to receive two voltage values at the input terminals I1 and I2 thereof and to produce the larger of the two from an output terminal OH and the smaller from another output terminal OL. Further details of each of the magnitude comparison circuits 232 to 236 are as shown in FIG. 15. Referring to FIG. 15, a comparator 266 is provided with positive-and negative-phase input terminals and positive-and negative-phase output terminals. A high level voltage is produced from the positive-phase output terminal and a low level voltage from the negative-pase output terminal when the positive input terminal voltage V+ and the negative-phase input terminal voltage V− is in a relation of V+≧V−. Analog switches 267 to 270 are arranged to become conductive when voltages received at their control terminals are at a high level and are in an open state when the voltage are at a low level. Assuming that the voltage coming to the input terminal I1 is VI1 and the voltage coming to the other input terminal I2 is VI2, the inputs of the comparator 266 are in a relation of the positive-phase input terminal voltage V+≧the negative-phase input terminal voltage V− in the case of VI1≧VI2. In this case, the positive-phase output terminal voltage of the comparator 266 is at a high level and the negative-phase output terminal voltage at a low level. Then, the control voltage applied to the analog switches 267 and 270 is at a high level and the control voltage to the analog switches 268 and 269 at a low level. Therefore, the switches 267 and 270 are in a conductive state and the switches 268 and 269 in an open state. This allows the voltage VI1 to be produced via the switch 267 to the output terminal OH and the voltage VI2 via the switch 270 to the other output terminal OL. In the case of vI1<VI2, the inputs of the comparator 266 are in a relation of the positive-phase input terminal voltage V+<the negative-phase input terminal voltage V−. In that case, the positive-phase output terminal voltage of the comparator 266 is at a low level and the negative-phase output terminal voltage at a high level. Then, since the control voltage of the analog switches 267 and 270 is at a low level, these switches 267 and 270 are in an open state. Since the control voltage of other analog switches 268 and 269 is at a high level, they are conductive. Then, the voltage VI2 is produced via the switch 269 to the output terminal OH while the voltage VI1 is produced via the switch 268 to the output terminal OL. In other words, the larger of the voltages VI1 and VI2 is thus produced from the output terminal OH and the smaller of them from the output terminal OL. In the case of FIG. 14, five magnitude comparison circuits are arranged to produce the largest of the voltages VC1, VC2, VC3 and VC4 as a voltage VH1; to produce the second largest of them as a voltage VH2; to produce the third largest of them as a voltage VH3; and to produce the smallest of them as a voltage VH4. The magnitude comparison circuit 232 is arranged to have the voltage VC1−Vvg2 supplied to its input terminal I1 and the voltage VC2−Vvg2 to the other input terminal I2 and to produce the larger of the two from its output terminal OH and the smaller of them from the other output terminal OL. The magnitude comparison circuit 233 is likewise arranged to have the voltage VC3−Vvg2 supplied to its input terminal I1 and the voltage VC4−Vvg2 to the other input terminal I2 and to produce the larger of the two from its output terminal OH and the smaller of the two from the output terminal OL. The magnitude comparison circuit 234 is arranged to receive at its input terminals I1 and I2 the voltages produced from the output terminals OH of the comparison circuits 232 and 233 to compare them with each other and to produce the larger of them from its output terminal OH and the smaller of them from its output terminal OL. The voltage which is produced from the output terminal OH of the circuit 234 is the largest of the voltages VC1−Vvg2, VC2−Vvg2, VC3−Vvg2 and VC4−Vvg2. The magnitude comparison circuit 235 is likewise arranged to receive at the input terminals I1 and I2 the voltages produced from output terminals OL of the magnitude comparison circuits 232 and 233 to compare them and to produce the larger of them from its output terminal OH and the smaller of them from the other output terminal OL respectively. The voltage thus produced from the output terminal OL of the circuit 235 is the smallest of the voltages VC1−Vvg2, VC2−Vvg2, VC3−Vvg2 and VC4−Vvg2. The magnitude comparison circuit 236 is arranged to receive at its input terminals I1 and I2 the voltages from the output terminals OL of the circuits 234 and 235 to compare them with each other. The circuit 236 thus compares and produces two intermediate voltage values among the voltages VC1−Vvg2, VC2−Vvg2, VC3−Vvg2 and VC4−Vvg2 excluding the largest and smallest of them. The seond largest of these values is thus produced from the output terminal OH of the circuit 236 and the third largest from the output terminal OL of the circuit 236. The voltages VC1−Vvg2, VC2−Vvg2, VC3−Vvg2 and VC4−Vvg2 are thus rearranged in the order of magnitude as follows: VH1≧VH2≧VH3≧VH4.

Again referring to FIG. 14, resistors 237 to 240 are of equal resistance values and are arranged to average the voltages VC1, VC2, VC3 and VC4. The output voltage VCm is: VCm=(VC1+VC2+VC3+VC4)/4−Vvg2. A reference voltage generating circuit 241 is arranged to produce four reference voltages Vr1, Vr2, Vr3 and Vr4 from output terminals r1 to r4. The reference voltages are in the following magnitude relation: Vr1≧Vr2≧Vr3≧Vr4. Comparators 242 to 245 are arranged to compare the above stated voltage VCm with the reference voltages Vr1, Vr2, Vr3 and Vr4 and to produce a high level voltage in cases of VCm≧Vr1, VCm≧Vr2, VCm≧Vr3 and VCm≧Vr4 respectively and a low level voltage in cases of VCm<Vr1, VCm<Vr2, VCm<Vr3 and VCm<Vr4. Reference numerals 246, 247, 248 and 249 denote inverters. Numerals 250, 251 and 252 denote AND gates. The inverter 246 receives the output of the comparator 242, the inverter 247 that of the comparator 243, the inverter 248 that of the comparator 244 and the inverter 249 that of the comparator 245. The AND gate 250 is arranged to receive the output of the inverter 246 at one of its input terminals and that of the comparator 243 at the other input terminal. The AND gate 251 is arranged to receive the output of the inverter 247 at one of its input terminals and that of the comparator 244 at the other input terminal. The AND gate 252 is arranged to receive the output of the inverter 248 at its one input terminal and that of the comparator 245 at the other input terminal. Numerals 253 to 256 denote OR gates. The OR gate 253 is arranged to receive the outputs of the comparator 242, the AND gate 250 and the AND gate 251 at its three input terminals respectively. The OR gate 254 has four input terminals which are arranged to receive the output of the comparator 242, that of the AND gate 250, that of the AND gate 251 and that of the AND gate 252. The OR gate 255 also has four input terminals which are arranged to receive the output of the AND gate 250, that of the AND gate 251, that of the AND gate 252 and that of the inverter 249 respectively. The OR gate 256 has three input terminals which are arranged to receive the output of the AND gate 251, that of the AND gate 252 and that of the inverter 249 respectively. Analog switches 257 to 260 are arranged to operate under the control of the OR gates 253 to 256. Resistors 261 to 264 are provided for the purpose of averaging two, three or all of the voltages VH1, VH2, VH3 and VH4 in the order of larger values or two or three of these voltages in the order of smaller values after these voltages are produced from the analog switches 257 to 260 when they are in their conductive states. An op amp 265 is arranged to have its output terminal connected to its negative-phase input terminal and to serve as a voltage follower. The op amp 265 is thus arranged to produce from its output terminal a voltage which is always equal to its positive-phase input terminal voltage irrespectively of the states of ensuing circuit elements. The output voltage VC of the ope amp 265 is produced from an output terminal OUT.

The relation of the voltage output VC to the magnitudes of voltages Vr1, Vr2, Vr3 and Vr4 shown in FIG. 14 in relation to the feature of the field and the value of the voltage VC to be obtained are as follows:

(1) $Vr1 \leq VCm$—The analog switches 257 and 258 are conductive: This condition suggests a scene having a fairly bright background. Therefore, among the peripheral areas 206C1, 206C2, 206C3 and 206C4, the luminance of any area having a relatively low degree of luminance is ignored and the output of the peripheral luminance value computing circuit 220 becomes $VC=(VH1+VH2)/2$.

(2) $Vr2 \leq VCm < Vr1$—The analog switches 257, 258 and 259 are conductive: This suggests a scene having a somewhat bright background like an outdoor scene under a clear sky. In the case of such a scene, an inapposite factor such as a low luminance background like a shadowed ground tends to appear. In this case, therefore, the area of the lowest luminance is ignored and the output becomes $VC=(VH1+VH2+VH3)/3$.

(3) $Vr3 \leq VCm \leq Vr2$—The analog switches 257, 258, 259 and 260 are conductive: This suggests a scene with a background of a normal brightness. For such a scene, neither a relatively bright part nor a relatively dark part cannot be ignored. The output VC, therefore becomes $VC=(VH1+VH2+VH3+VH4)/4$.

(4) $Vr4 \leq VCm < Vr3$—The analog switches 258, 259 and 260 are conductive: This suggests a scene with a somewhat dark background. Therefore, an area having the highest degree of luminance is ignored and the output VC becomes $VC=(VH2+VH3+VH4)/3$.

(5) $VCm < Vr4$—The analog switches 259 and 260 are conductive: That suggests a scene of a considerably dark background like a night scene. In such a case, some factor inappropriate for obtaining a background luminance locally showing a high degree of luminance tends to appear like an electric lamp light. In this case, therefore, the output VC becomes $VC=(VH3+VH4)/2$.

As described in the foregoing, the peripheral luminance value computing circuit 220 is arranged to obtain the output value VC, according to the brightness condition of the outermost peripheral part of the field, by averaging two, three or four of the voltages VH1, VH2, VH3 and VH4 in the order of higher values or two or three of them in the order of smaller values. The average value VC which is thus obtained is produced from the output terminal OUT.

Referring again to FIG. 13, a selection circuit 221 receives, at its input terminals IN1, IN2 and IN3, the output voltages VA and VB of the logarithmic compression circuits 315 and 316 and the output voltage VC of the above stated peripheral luminance value computing circuit 220. The circuit 221 is arranged to determine which of a plurality of computing formulas is to be selected according to these inputs. Resistors 222, 223 and 224 are of equal resistance values. A numeral 225 denotes an analog switch. A mean value circuit is formed jointly by the resistors 222, 223 and 224 and the analog switch 225. When a high level voltage which is produced from an output terminal A/P of the selection circuit 221 is supplied to the control terminal of the analog switch 225, the switch becomes conductive. As a result, the output voltage V1 of the mean value circuit becomes $(VA+VB+VC)/3$. When a low level voltage is produced from the output terminal A/P of the circuit 221 and supplied to the control terminal of the same switch 225, the switch is open to cause the output voltage V1 of the mean value circuit to become $(VA+VB)/2$. An ope amp 226 is arranged to serve as a voltage follower with its output terminal and its negative-phase input terminal interconnected. The ope amp 226 has the output voltage V1 of the mean value circuit supplied to its positive-phase input terminal. The output terminal voltage of the ope amp 226 remains the same as the input V1 irrespectively of ensuing circuit conditions. Resistors 227, 228, 229 and 230 are of equal resistance values. They form a subtraction circuit in conjunction with an ope amp 231. Assuming that the voltage produced from the output terminal OUT of the selection circuit 221 is V2, this subtraction circuit produces a voltage $V1-V2$. The voltage $V1-V2$ represents a measured light value determined by a plurality of computing formulas which will be described later herein.

FIG. 16 is a circuit diagram showing by way of example the arrangement of the selection circuit 221 of FIG. 13. Resistors 271, 272, 273 and 274 are of equal resistance values. These resistors form a first subtraction circuit in conjunction with an ope amp 275. A second subtraction circuit is likewise formed jointly by another ope amp 280 and resistors 276, 277, 278 and 279 which are of equal resistance values. The first subtraction circuit is arranged to receive the voltages VA and VB and to produce a voltage $VA-VB$. The second subtraction circuit is arranged to receive the voltages VB and VC and to produce a voltage $VC-VB$. A reference voltage generating circuit 281 is arranged to generate a reference voltage Vr5. A comparator 282 is arranged to receive the voltage VC at its positive-phase input terminal and the reference voltage Vr5 at its negative-phase input terminal and to produce a high level voltage in the case of $VC \geq Vr5$ and a low level voltage in the case of $VC < Vr5$. A reference voltage generating circuit 285 is arranged to generate reference voltages VPa, VPb, VQa and VQb. The circuit 285 is provided with a control terminal B/D which is arranged to receive the output voltage of the comparator 282 as a control voltage. The circuit 285 is assumed to produce the reference voltages in a state of $VPa=VP1$, $VPb=VP2$, $VQa=VQ1$ and $VQb=VQ2$ when the control voltage received at the terminal B/D is at a high level; and in a state of $VPa=VP3$, $VPb=VP4$, $VQa=VQ3$ and $VQb=VQ4$ when the control voltage is at a low level. The reference voltages VP1, VP3, VQ1 and VQ3 have the plus sign and the reference voltages VP2, VP4, VQ2 and VQ4 have the minus sign respectively. Reference numerals 286 and 287 denote comparators and numerals 288 and 289 inverters. The comparators 286 and 287 receive at their positive-phase input terminals the output voltages $VB-VA$ of the ope amp 275 of the first subtraction circuit. The comparator 286 is arranged to receive at its negative-phase input terminal either the reference voltage VP1 or VP3 according to whether the control voltage supplied to the control terminal B/D of the reference voltage generating circuit 285 is at a high level or at a low level. The comparator 287 is likewise arranged to receive at its negative-phase input terminal either the reference voltage VP2 or VP4. Numerals 290 and 291 denote comparators and 292 and 293 inverters. The positive-phase input terminals of the comparators 290 and 291 are arranged to receive the output voltage VC−VB of the ope amp 280 of the second subtraction circuit. The comparator 291 has its negative-phase input terminal arranged to receive either the reference voltage VQ1 or VQ3 according to whether the control voltage supplied to the control terminal B/D of the reference voltage generating circuit 285 is at a high level or at a low level. The comparator 290 also has its negative-phase input terminal arranged to receive either the reference voltage VQ2 or VQ4. The output terminal of each of the comparators 286, 287, 290 and 291 produces, according to the magnitude relation between the positive-phase input terminal voltage V+ and the negative-phase input terminal voltage V−, a high level voltage in the case of V+≧V− or a low level voltage in the case of V+<V−. Numerals 294 to 299 and 400 to 402 denote AND gates. One of the AND gates produces a high level voltage according to the combination of high and low levels of voltages produced from the output terminals of the comparators 286, 287, 290 and 291 while the rest of the AND gates produce low level voltages. The magnitude relations between the voltage VB−VA and the voltages VPa and VPb and between the voltage VC−VB and the voltages VQa and VQb determines which of the AND gates 294 to 290 and 400 to 402 produces a high level output in a manner as listed below:

(1) $VB - VA \geq VPa$:
  (i) $VC - VB \geq VQa$:     AND gate 294
  (ii) $VQa > VC - VB \geq VQb$:   AND gate 295
  (iii) $VQb > VC - VB$:     AND gate 296

(2) $VPa > VB - VA \geq VPb$:
  (i) $VC - VB \geq VQa$:     AND gate 297
  (ii) $VQa > VC - VB \geq VQb$:   AND gate 298
  (iii) $VQb > VC - VB$:     AND gate 299

(3) $VPb > VB - VA$:
  (i) $VC - VB \geq VQa$:     AND gate 400
  (ii) $VQa > VC - VB \geq VQb$:   AND gate 401
  (iii) $VQb > VC - VB$:     AND gate 402

An inverter 403 is arranged to invert the output state of the comparator 282. Numerals 408 and 409 denote OR gates; 410 and 411 AND gates; and 412 an OR gate. The OR gate 408 is arranged to receive at its four input terminals the outputs of the AND gates 298, 299, 401 and 402. When any one of the AND gates 298, 299, 401 and 402 produces a high level voltage, the output level of the OR gate 408 becomes high. OR gate 409 is arranged to receive at its six input terminals the outputs of the AND gates 296, 298, 299 and 400 to 402. When any one of these AND gates 296, 298, 299 and 400 to 402 produces a high level output, the output voltage level of the OR gate 409 becomes high. The AND gate 410 is arranged to have the output of the OR gate 408 supplied to one of its input terminals and the output of the comparator 282 to the other input terminal respectively. When the output of the comparator 282 is at a high level, the output of the AND gate 410 is equal to that of the OR gate 408. At this time, the output of the inverter 403 which is obtained by inverting the output of the above stated comparator 282 is supplied to one of two input terminals of the AND gate 411. Therefore, the output of the AND gate 411 is then at a low level. The output of the OR gate 409 is supplied to one of two input terminals of the AND gate 411 while the output of the inverter 403 is supplied to the other input terminal. When the comparator 282 produces a low level voltage, the low level voltage is supplied to one of the input terminals of the AND gate 410 to cause the AND gate 410 to produce its output voltage at a low level. In this instance, the output voltage of the inverter 403 is at a high level. The output of the AND gate 411 is equal to that of the OR gate 409. The outputs of the AND gates 410 and 411 are respectively supplied to the OR gate 412. When at least one of the AND gates 410 and 411 produces a high level voltage output, the output level of the OR gate 412 becomes high. The OR gate 412 is arranged to produce its output from the output terminal A/P which is indicated also in FIG. 13. Numerals 413 to 417 and 419 to 423 denote AND gates; 418 and 424 OR gates; 425 a NOR gate; and 426 a reference voltage generating circuit The circuit 426 is arranged to generate reference voltages Vr, Vr9, Vr10, Vr11, −Vr12, −Vr13, −Vr14 and −Vr15. Numerals 427 to 435 denote analog switches. The AND gates 413 to 417 have two input terminals respectively and each of them is arranged to receive the output of the comparator 282 at one input terminal. Each of the AND gates 419 to 423, which also have two input terminals respectively, is arranged to receive the output of the inverter 403 at its one input terminal. Meanwhile, the other input terminal of the AND gate 413 is arranged to receive the output of the AND gate 294; that of the AND gate 414 to receive the output of the AND gate 295; that of the AND gate 415 to receive the output of the AND gate 296; that of the AND gate 416 to receive the output of the AND gate 299; and that of the AND gate 417 to receive the output of the AND gate 402 respectively Further, the other input terminal of the AND gate 419 is arranged to receive the output of the AND gate 294; that of the AND gate 420 to receive the output of the AND gate 297; that of the AND gate 421 to receive the output of the AND gate 400; that of the AND gate 422 to receive the output of the AND gate 401; and that of the AND gate 423 to receive the output of the AND gate 402 respectively. Therefore, when a high level voltage is produced from the comparator 282, each of the AND gates 413 to 417 receives the high level voltage at one of its input terminals. Meanwhile, a low level voltage is supplied via the inverter 403 to one of the input terminals of each of the AND gates 419 to 423. Therefore, the AND gate 413 produces the output of the AND gate 294 as it is. The AND gate 414 produces the output of the AND gate 295 as it is. The AND gate 415 produces the output of the AND gate 296 as it is. The AND gate 416 produces the output of the AND gate 299 as it is. The AND gate 417 produces the output of the AND gate 402 as it is. The output voltages of other AND gates 419 to 423 are at a low level. In case that the output voltage from the comparator 282 is at a low level and that of the inverter 403 at a high level, the output voltage levels of the AND gates 413 to 417 become low. Meanwhile, the AND gate 419 produces the output of the AND gate 294 as it is. The AND gate 420 produces the output of the AND gate 297 as it is. The AND gate 421 produces the output of the AND gate 400 as it is. The AND gate 422 produces the output of the AND gate 401 as it is. The AND gate 423 produces the output of the AND gate 402 as it is. The OR gate 418 has the output of the AND gate 414 supplied to one of two input terminals thereof and the output of the AND gate 415 to the other input terminal. The output level of the OR gate 418 is high when the output voltage of at least one of the AND gates 415 and 416 is high. The OR gate 424 has the output of the AND gate 421 supplied to one of two input terminals thereof and the output of the AND gate 422 to the other input terminal. The output level of the OR gate 424 is high when the output voltage of at least one of the AND gates 421 and 422 is high. The NOR gate 425 has eight input terminals which are arranged to receive the output of the AND gate 413, that of the OR gate 418, that of the AND gate 416, that of the AND gate 417, that of the AND gate 419, that of the AND gate 420, that of the OR gate 424 and that of the AND gate 423 respectively. The output voltage of the NOR gate 425 is at a high level when the levels of all the output voltages of the AND gates 413 to 417 and 419 to 423 are low and remains at a low level under all conditions other than that condition.

Analog switches 427 to 430 and 432 to 435 are arranged to have the above stated reference voltages applied from the reference voltage generating circuit 426 to their input terminals. The input terminal of the switch 427 receives the reference voltage $Vr8$; that of the switch 428 the reference voltage $Vr9$; that of the switch 429 the reference voltage $Vr10$; that of the switch 430 the reference voltage $Vr11$; that of the switch 432 the reference voltage $-Vr12$; that of the switch 433 the reference voltage $-Vr13$; that of the switch 434 the reference voltage $-Vr14$; and that of the switch 435 the reference voltage $-Vr15$ respectively. Another analog switch 431 has zero voltage at its input terminal. The output terminals of the analog switches 427 to 435 are interconnected and the output voltage of these analog switches is arranged to be produced from the output terminal OUT of the selection circuit 221. The control terminal of the analog switch 427 is arranged to receive the output of the AND gate 413; that of the switch 428 to receive the output of the OR gate 418; that of the switch 429 to receive the output of the AND gate 416; that of the switch 430 to receive the output of the AND gate 417; that of the switch 431 to receive the output of the NOR gate 425; that of the switch 432 to receive the output of the AND gate 419; that of the switch 433 to receive the output of the AND gate 420; that of the switch 434 to receive the output of the OR gate 424; and that of the switch 435 to receive the output of the AND gate 423 respectively. Irrespectively of the levels and the magnitudes of the three input voltages VA, VB and VC received at the selection circuit 221, the output terminal level of one of the AND gate 413, OR gate 418, AND gate 416, AND gate 417, NOR gate 425, AND gate 419, AND gate 420, OR gate 424 and AND gate 423 becomes high while that of the rest of them is low. Therefore, among the analog switches 427 to 435, only one of them that has a control voltage applied thereto becomes conductive while other analog switches are open. When the output level of the AND gate 413 is high, the analog switch 427 becomes conductive to allow the voltage $Vr8$ to be produced from the output terminal OUT. When the output level of the OR gate 418 is high, the switch 428 becomes conductive to allow the voltage $Vr9$ to be produced from the output terminal OUT. When the output level of the AND gate 416 is high, the switch 429 becomes conductive to allow the voltage $Vr10$ to be produced from the output terminal OUT. When that of the AND gate 417 is high, the switch 430 becomes conductive to allow the voltage $Vr11$ to be produced from the terminal OUT. When that of the NOR gate 425 is high, the switch 432 becomes conductive to allow the zero voltage output to be produced from the terminal OUT. When that of the AND gate 419 is high, the switch 432 becomes conductive to allow the voltage $-Vr12$ to be produced from the terminal OUT. When that of the AND gate 420 is high, the switch 433 becomes conductive to allow the voltage $-Vr13$ to be produced from the terminal OUT. When that of the OR gate 424 is high, the switch 434 becomes conductive to allow the voltage $-Vr14$ to be produced from the terminal OUT. When that of the AND gate 423 is high, the switch 435 becomes conductive to allow the voltage $-Vr15$ to be produced from the output terminal OUT. Further, it is to be noted that these voltages are in the following relations: $Vr8$, $Vr9$, $Vr10$, $Vr11 > 0$ and $-Vr12$, $-Vr13$, $-Vr14$, $-Vr15 < 0$.

Figure 17A:
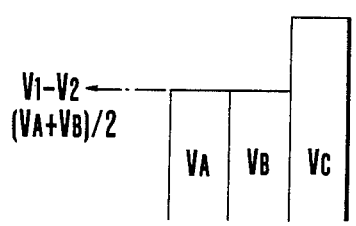

The operations of the circuits shown in FIGS. 13 to 16 are as described below with reference to FIGS. 17(a) to 19(i):

(1) In case that the voltage VC (hereinafter referred to as a luminance signal VC) which is obtained from the outermost area 206C (consisting of the areas 206C1 to 206C4) of the light receiving element 206 of FIG. 10 is higher than the reference voltage $Vr5$, i.e. in the case of $VC > Vr5$, it is assumed that the field is an outdoor scene with a bright object in the background such as a sky and that the image plane is bright in the peripheral portion thereof. In this instance, a measured light value $V1 - V2$ is obtained from the following operations by using as applicable a luminance signal difference $VB - VA$ (hereinafter referred to as a luminance signal difference $\Delta BA$), another luminance signal difference $VC - VB$ (hereinafter referred to as a luminance signal difference $\Delta CB$) and the reference voltages VP1, VP2, VQ1 and VQ2 (as in a relation of $VP2 < 0 < VP1$ and $VQ2 < 0 < VQ1$):

(1-1) In the case of $VP2 < \Delta BA < VP1$
$VQ1 < \Delta CB$:

In this case, the luminance signal difference $\Delta BA$ between luminance signals obtained from the middle area 206A and the peripheral area 206B of the field is small as shown in FIG. 17(a). Meanwhile the luminance signal difference $\Delta CB$ between the luminance signals obtained from the area 206B and the outermost peripheral area 206C exceeds the predetermined value VQ1 on the plus sign side. In this instance, the main object can be assumed most likely to be occupying both the areas 206A and 206B. Accordingly, in order to make an exposure apposite to the main object, importance is attached to the luminance signals VA and VB of the areas 206A and 206B, without using any correction coefficient. Thus, the measured light value $V1 - V2$ is obtained from the following computing formula:

$$V1 - V2 = (VA + VB)/2$$

Among the circuit elements shown in FIGS. 13 to 16, the operation of the selection circuit 221 which is shown in FIG. 16 is first described as follows in connection with the condition described above: Since the luminance signal VC obtained from the outermost peripheral area 206C (consisting of areas 206C1 to 206C4) is higher than the reference voltage Vr5 in this instance, the comparator 282 produces a high level output. Therefore, a high level signal is supplied to the control terminal B/D of the reference voltage generating circuit 285. As a result of this, the reference voltages of the circuit 285 become VPa=VP1, VPb=VP2, VQa=VQ1 and VQb=VQ2. Meanwhile, the voltage signal output VB−VA of the ope amp 275 comes to satisfy the condition of VP2<ΔBA<VP1. Therefore, the output level of the comparator 286 becomes low and that of the comparator 287 high. The signal voltage output VC−VB of the ope amp 280 then comes to satisfy the condition of VQ1<ΔCB. This causes the output levels of both the comparators 290 and 291 to become high. Therefore, the output level of the AND gate 297 alone becomes high among others. The high level output of the AND gate 297 and the low level outputs of other AND gates 294 to 296, 298, 299 and 400 to 402 cause the output level of the OR gate 412 to become low and thus cause the output level of the output terminal A/P to become low. Then, the output level of the NOR gate 425 is alone caused to become high while the output levels of AND gates 413 to 423 are caused to become low. As a result, the value of the voltage V2 produced from the output terminal OUT becomes zero volt. Therefore, the ope amp 226 of FIG. 13 produces a voltage (VA+VB)/2. The ope amp 231 receives a zero volt input to its negative-phase input terminal. The output V1−V2 of the ope amp 231, therefore, becomes the voltage (VA+VB)/2.

Figure 17B:
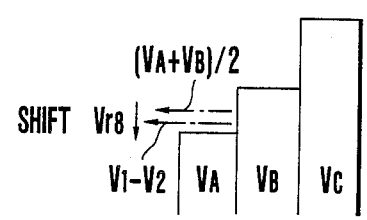

(1-2) In the case of $VP1 < \Delta BA$
$VQ1 < \Delta CB$:

In that case, the luminance signal difference ΔBA between the luminance signals of the areas 206A and 206B is larger than the predetermined value VP1 on the plus side and the difference ΔCB between the luminance signals of the areas 206B and 206C is also larger than the predetermined value VQ1 on the plus side as shown in FIG. 17(b). Then, the main object can be assumed to exist most likely in the whole of the area 206A and a part of the area 206B. Then, the measured light value V1−V2 may be obtained only from the luminance signal VA of the area 206A in this instance. However, in accordance with the past experiences, a better exposure value is obtainable by taking the luminance signal for the background also into consideration to some degree. Therefore, the measured light value V1−V2 is obtained by using the correction coefficient Vr8 along with the luminance signals VA and VB for the main object from the following formula:

$$V1-V2=(VA+VB)/2-Vr8$$

The circuit operation in this instance is as follows: All the comparators 286, 287, 290, 291 and 282 produce high level outputs. The AND gate 294 alone produces a high level output. Other AND gates 295 to 299 and 400 to 402 produce low level outputs. Therefore, the output level of the OR gate 412 becomes low. The output level of the AND gate 413 becomes high (to make the analog switch 427 conductive). Then, the voltage output of the ope amp 226 of FIG. 13 becomes (VA+VB)/2. The output V1−V2 of the ope amp 231 becomes (VA+VB)/2−Vr8.

Figure 17C:
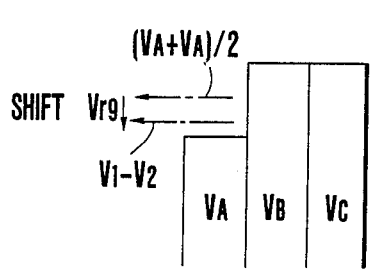

(1-3) In the case of $VP1 < \Delta BA$
$VQ2 < \Delta CB < VQ1$:

FIG. 17(c) shows this condition. As shown, the luminance signal difference ΔBA between the luminance signals of the areas 206A and 206B is larger than the given value VP1 on the plus sign side. Meanwhile, the difference ΔCB between the luminance signals of the areas 206B and 206C is small. Therefore, the main object can be regarded either as existing covering the whole area 206A or as likely to be small. In this case, the measured light value V1−V2 may be obtained solely for the main object existing within the area 206A. However, in order to have an apposite exposure for the main object with the luminance signal VB for the area 206B which corresponds to the background also taken into consideration, the measured light value V1−V2 is obtained by using the correction coefficient Vr9 (Vr9>Vr8) in accordance with the following computing formula:

$$V1-V2=(VA+VB)/2-Vr9$$

The circuit operation for this is as follows: The comparators 286, 287 and 290 produce high level outputs and, among the AND gates, the AND gate 295 alone produces a high level output. Other AND gates 294, 296 to 299 and 400 to 402 produce low level outputs. The comparator 282 produces a high level output. As a result, the output level of the OR gate 412 becomes low and that of the OR gate 418 becomes high to make the analog switch 428 conductive. The ope amp 226 of FIG. 13 produces a voltage (VA+VB)/2 and the output V1−V2 of the ope amp 231 becomes (VA+VB/2−Vr9.

(1-4) $VP1 < \Delta BA$
$\Delta CB < VQ2$

Figure 17D:
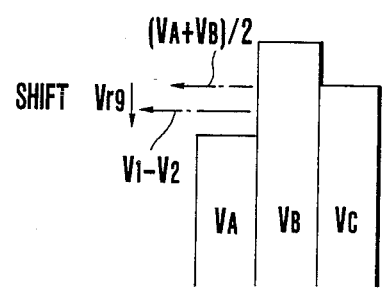

FIG. 17(d) represents this condition. In this case, the luminance signal difference ΔBA between luminance signals for the areas 206A and 206B is larger than the given value VP1 which is on the plus sign side. Meanwhile, the luminance signal difference ΔCB between the signals for the areas 206B and 206C is smaller than the given value VQ2 which is on the minus sign side. Then, the condition suggests either a main object of about the same size as in the case of Para. (1-3) above with an object of a high degree of brightness (as in the case of the sun or a reflecting sea surface or the like) located in the area 206B or a fairly bright main object located in the area 206B as in the case of a landscape. In this case, data obtained from all the areas 206A, 206B and 206C may be used and the measured light value V1−V2 may be computed without any correction coefficient, by a formula $V1-V2=(VA+VB+VC)/3$. In the case of this embodiment, however, another method is employed for obtaining a good result. In other words, like in the case of Para. (1-3) above, the measured light value is obtained from the luminance values of the areas 206A and 206B with the correction coefficient Vr9 also used in accordance with the following formula:

$$V1-V2=(VA+VB)/2-Vr9$$

The circuit operation for the above is as follows: The comparators 286 and 287 produce high level outputs while comparators 290 and 291 produce low level outputs. The AND gate 296 produces a high level output while other AND gates 294, 295, 297 to 299 and 400 to 402 produce low level outputs. The comparator 282 produces a high level output. Therefore, the output level of the OR gate 412 becomes low and that of the OR gate 418 high to make the analog switch 428 conductive. The ope amp 226 of FIG. 13 produces a voltage (VA+VB)/2 and the output V1−V2 of the ope amp 231 becomes (VA+VB)/2−Vr9.

(1-5)  $VP2 < \Delta BA < VP1$
       $\Delta CB < VQ2$

Figure 17E:
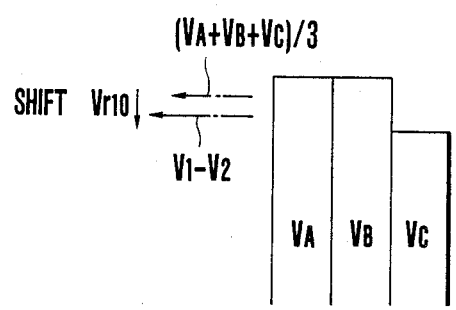

The above condition is as shown in FIG. 17(e). In this case, the difference ΔBA between the luminance signals for the areas 206A and 206B is small. The difference ΔCB between the luminance signals for the areas 206B and 206C is of a negative value exceeding the given value Vq2 in absolute value. This indicates that the main object exists covering both the areas 206A and 206B and is whitish in color. In this case, the measured light value may be obtained only from the areas 206A and 206B. However, if the luminance of the peripheral part of the image plane is lower than that of the middle part, the whitish main object can be better photographed (under a high-light control) by obtaining the measured light value with the luminance of the peripheral area 206C of the image plane also taken into consideration to a certain degree. Data obtained in the past has shown that the latter method gives a better exposure value. Therefore, in this case, to have such an exposure that high-light depicts the main object, the measured light value V1−V2 is obtained using all the luminance signals VA, VB and VC with a correction coefficient Vr10 also used in accordance with the following formula:

$$V1-V2=(VA+VB+VC)/3-Vr10$$

To carry out the above formula, the circuit arrangement of this embodiment operates as follows: The comparator 287 produces a high level output. Meanwhile, the comparators 286, 290 and 291 produce low level outputs. The AND gate 299 produces a high level output. Other AND gates 294 to 298 and 400 to 402 produce low level outputs. The comparator 282 then produces a high level output. As a result, the output level of the OR gate 412 becomes high. The AND gate 416 then produces its output at a high level to render the analog switch 429 conductive. The output of the ope amp 226 of FIG. 13 then becomes a voltage (VA+VB+VC)/3 and the output V1−V2 of the ope amp 231 a voltage (VA+VB+BC)/3−Vr10.

(1-6)  $\Delta BA < VP2$
       $\Delta CB < VQ2$

Figure 17F:
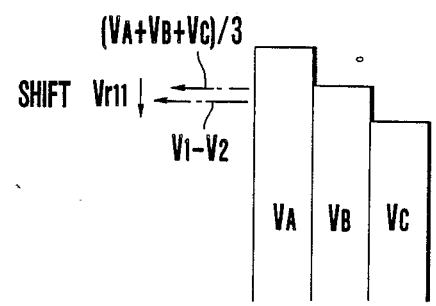

The above condition is as shown in FIG. 17(f). In that case, the difference ΔBA between the luminance signals for the areas 206A and 206B is of a negative value and exceeds the given value VP2 in absolute value. The difference ΔCB between the luminance signals for the areas 206B and 206C is also a negative value and exceeds the given value VQ2. That condition indicates that the main object is of a medium size and whitish in color existing not only in the whole area 206A but also partly in the area 206B. Then, to have the main object high-light depicted like in the case of Para. (1-5) above, the measured light value V1−V2 is obtained using a correction value Vr11 (Vr11<Vr10) along with the luminance values of the areas 206A, 206B and 206C in accordance with the following computing formula:

$$V1-V2=(VA+VB+VC)/3-Vr11$$

The circuit operation for the above is as follows: All the comparators 286 to 291 produce low level outputs. The AND gate 402 produces a high level output. Other AND gates 294 to 299 and 400 to 401 produce low level outputs. The comparator 282 produces a high level output. This causes the OR gate 412 to produce a high level output. The AND gate 417 then produces a high level output to render the analog switch 430 conductive. As a result, the output of the ope amp 226 of FIG. 13 becomes a voltage (VA+VB+VC)/3. The output V1−V2 of the ope amp 231 becomes (VA+VB+VC)/3 Vr11.

(1-7)  $\Delta BA < VP2$
       $VQ2 < \Delta CB < VQ1$

Figure 17G:
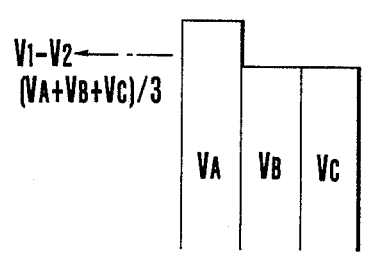

FIG. 17(g) shows the above condition. The difference ΔBA between the luminance signals for the areas 206A and 206B is of a negative value exceeding the given value Vp2 in absolute value. The difference ΔCB between the luminance values for the areas 206B and 206C is small. Therefore, the main object is assumed to be within the area 206A or to be very small in size and to be whitish in color. To give such an exposure that high-light depicts the main object, like in the foregoing case, the measured light value V1−V2 is obtained using the luminance values of the areas 206A, 206B and 206C, without any correction coefficient, in accordance with the following formula:

$$V1-V2=(VA+VB+VC)/3$$

The circuit operation for the above is as follows: The comparator 290 produces a high level output. The comparators 286, 287 and 291 produce low level output. The AND gate 402 produces a high level output. Other AND gates 294 to 299, 400 and 402 produce low level outputs. The comparator 282 produces a high level output. This causes the OR gate 412 to produce a high level output. The NOR gate 425 also produces a high level output, which then renders the analog switch 430 conductive. The output of the ope amp 226 of FIG. 13 becomes a voltage (VA+VB+VC)/3. The output V1−V2 then becomes (VA+VB+VC)/3.

(1-8)  $\Delta BA < VP2$
       $VQ1 < \Delta CB$

Figure 17H:
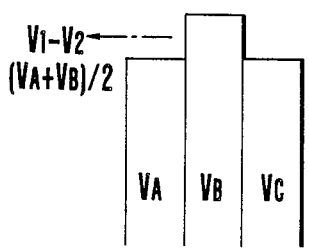

The above condition is as shown in FIG. 17(h). In this instance, the difference ΔBA between the luminance signals for the areas 206A and 206B is of a negative value exceeding the given value VP2 in absolute value. The difference ΔCB between the luminance signals for the areas 206B and 206C is larger than the given value VQ1. This suggests a case where the main object is of about the same size as in the case of Para. (1—1) above and varies in brightness thereof having a somewhat brighter part located within the area 206A; and another case where the area 206B includes an object of a considerably low degree of brightness. In this instance, the measured light value V1−V2 may be adequately obtained from all the luminance values of the areas 206A, 206B and 206C without using any correction coefficient in accordance with a formula V1−V2=(VA+VB+VC)/3. However, this embodiment employs another method for obtaining a good result. In this case, the measured light value is obtained by using the luminance values of the areas 206A and 206B like in the case of Para. (1—1) without any correction coefficient in accordance with the following computing formula:

$$V1-V2=(VA+VB)/2$$

The circuit operation for carrying out the Formula above is as follows: The comparators 290 and 291 produce high level outputs. Meanwhile, the comparators 286 and 287 produce low level outputs. The AND gate 400 produces a high level output. Other AND gates 294 to 299, 401 and 402 produce low level outputs. The comparator 282 produces a high level output. As a result, the OR gate 412 produces a low level output to cause the NOR gate 425 to produce a high level output. This causes the ope amp 226 of FIG. 13 to produce a voltage (VA+VB)/2. Then, the output V1−V2 of the ope amp 231 becomes VA+VB)/2.

(1-9)    $VP2 < \Delta BA < VP1$
        $VQ2 < \Delta CB < VQ1$

Figure 17I:
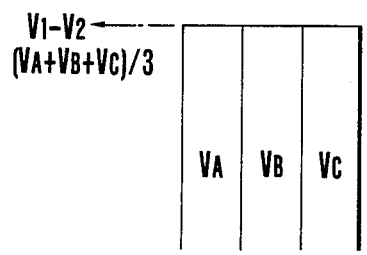

The above condition is as shown in FIG. 17(i). The difference ΔBA between the luminance signals for the areas 206A and 206B is small. The difference ΔCB between the luminance signals for the areas 206B and 206C is also small. This indicates either a case where the main object occupies the whole field or a case where nothing is intended to be regarded as the main object like in the case of a landscape. In this instance, the measured light value is obtained by using the luminance values of the areas 206A and 206B, without any correction coefficient, in accordance with the following formula:

$$V1-V2=(VA+VB+VC)3$$

The circuit operation for the above is as follows: The comparators 287 and 290 produce high level outputs. The comparators 286 and 291 produce low level outputs. The AND gate 298 produces a high level output. Other AND gates 294 to 297, 299 and 400 to 402 produce low level outputs. The comparator 282 produces a high level output to cause the OR gate 412 to produce a high level output. The NOR gate 425 produces a high level output to cause the ope amp 226 to produce a voltage (VA+VB+VC)/3. As a result, the output V1−V2 of the ope amp 231 also become (VA+VB+VC)/3.

Figure 18A:
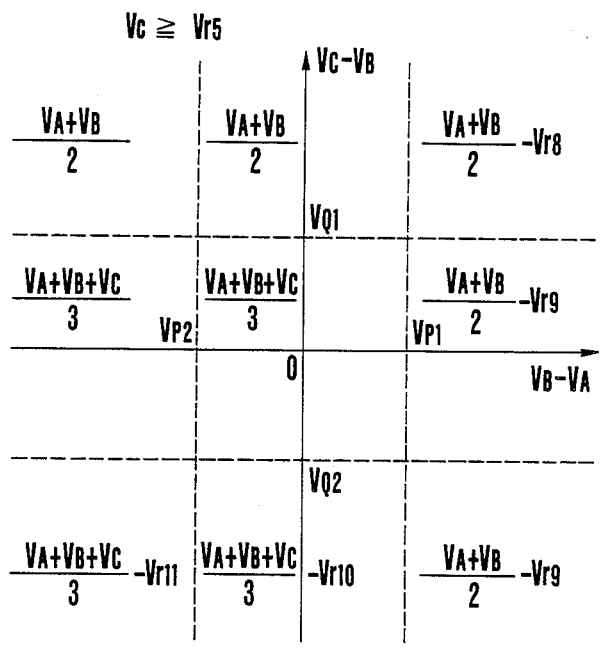

FIG. 18(a) shows the interrelation of the computing formulas to be carried out according to the various luminance conditions described in the foregoing paragraphs (1—1) to (1-9).

(2) In cases where the luminance signal VC obtained from the outermost peripheral area 206C (which consists of areas 206C1 to 206C4) is smaller than the reference voltage Vr5, i.e. VC<Vr5, and where the photographing scene is assumed to be an indoor scene having a wall or the like in the background, the constant coefficients VP3, VP4 and VQ4 (VP4<0<VP3 and VQ4<0 VQ3) are selectively used according to the values of the luminance signal differences ΔBA and ΔCB in a manner similar to the cases described in Para. (1) above in obtaining the measured light value V1−V2.

(2-1)    $VP4 < \Delta BA < VP3$
        $VQ3 < \Delta CB$

The above condition is as shown in FIG. 19(a). In this case, the difference ΔBA between the luminance signals for the area 206A and 206B is small. Meanwhile, the difference ΔCB between the luminance signals for the areas 206B and 206C is larger than the given value VQ3. This suggests that the main object is large covering both the areas 206A and 206B and is blackish in color. Then, the measured light value may be obtained from the luminance values of the areas 206A and 206B without using any correction coefficient. However, it is desirable to have the blackish main object to be photographed in a blackish color without fail (by shadow control). In view of that, the embodiment is arranged to make such an exposure that shadow depicts the main object. For this purpose, the measured light V1−V2 is obtained by using the correction coefficient −Vr13, which is on the minus sign side, along with the luminance values of the areas 206A and 206B in accordance with the following computing formula:

$$V1-V2=(VA+VB)/2+Vr13$$

The circuit operation for this is as follows: Since the luminance signal (voltage) VC for the outermost peripheral area 206C (consisting of areas 206C1 to 206C4) is small, the comparator 282 produces a low level output. By this, a low level signal is supplied to the control terminal B/D of the reference voltage generating circuit 285. Then, the reference voltages of the circuit 285 become: VPa=VP3, VPb=VP4, VQa=VQ3, VQb=VQ4. In the meantime, the comparator 286 produces a low level output. The comparators 287, 290 and 291 produce high level outputs respectively. The AND gate 297 produces a high level output. Other AND gates 294 to 296, 298, 299 and 400 to 402 produce low level outputs. The inverter 403 then produces a high level output. This causes the OR gate 412 to produce a low level output. The AND gate 420 produces a high level output to render the analog switch 433 conductive. As a result, the ope amp 226 of FIG. 13 produces a voltage (VA+VB)/2. Then, the output V1−V2 of the ope amp 231 becomes (VA+VB)/2+Vr13.

(2-2)    $VP3 < \Delta BA$
        $VQ3 < \Delta CB$

FIG. 19(b) represents this condition. As shown in FIG. 19(b), the difference ΔBA between the luminance signals for the areas 206A and 206B is larger than the given value VP3. The difference ΔCB between the luminance signals for the areas 206B and 206C are larger than the given value VQ3. This suggests a case where the main object covers the whole of the area 206A and a part of the area 206B and is blackish in color. In this case, in order to have a shadow depicting exposure like in the case of Para. (2-1) above, the measured light value V1−V2 is obtained by using the correction coefficient——Vr12 the minus sign side ($|Vr12| < |Vr13|$) along with the luminance values of the areas 206A and 206B in accordance with the following computing formula:

$$V1 - V2 = (VA + VB)/2 + Vr12$$

The circuit operation for this: The comparators 286 to 291 all produce high level outputs. The AND gate 294 produces a high level output. Other AND gates 295 to 299 and 400 to 402 produce low level outputs. The inverter 403 produces a high level output. This makes the output level of the OR gate 412 low and that of the AND gate 420 high. As a result, the ope amp 226 of FIG. 13 produces a voltage (VA+VB)/2. The output V1−V2 of the ope amp 231 becomes (VA+VB)/2+Vr12.

(2-3)  $VP3 < \Delta BA$
       $VQ4 < \Delta CB < VQ3$

The above condition is as shown in FIG. 19(c). The difference ΔBA between the luminance signals for the areas 206A and 206B is larger than the given value VP3 while the difference ΔCB between the luminance signals for the areas 206B and 206C is small. This condition suggests either a case where the main object covers the whole area 206A or a case where the main object is small and blackish in color. This requires a shadow depicting exposure for the main object part. For that purpose, the measured light value V1−V2 is obtained by using the luminance values of the areas 206A and 206B, with no correction coefficient, in accordance with the following computing formula:

$$V1 - V2 = (VA + VB)/2$$

The circuit operation for the above is as follows: The comparator 291 produces a low level output. The comparators 286 to 290 produce high level outputs. The AND gate 295 produces a high level output. Other AND gates 294, 296 to 299 and 400 to 402 produce low level outputs. The inverter 403 produces a high level output. This causes the OR gate 412 to produce a low level output and the NOR gate 425 to produce a high level output. Then, the ope amp 226 of FIG. 13 produces a voltage (VA+VB)/2. The output V1−V2 of the ope amp 231 also becomes (VA+VB)/2.

(2-4)  $VP3 < \Delta BA$
       $\Delta CB < VQ4$

FIG. 19(d) shows this condition. The difference BA between the luminance signals for the areas 206A and 206B is larger than the given value VP3 while the difference CB between the luminance signals for the areas 206B and 206C is of a negative value which is larger than the given value VQ4 in absolute value. The condition thus suggests a case where the main object is of about the same size as in the case of Para. (2-3) above and, in addition to that, there is an object of a high degree of brightness (such as an electric lamp light) in the area 206B in an indoor scene. Compared with an outdoor scene where the sun or the like is located in the area 206B, a photographing operation on an indoor scene with a high brightness object located within the area 206B like in the present case is not likely to be affected too much by such a high degree of brightness, according to data obtained in the past. In this instance, therefore, the measured light value V1 to V2 is obtained by using the luminance values of the areas 206A, 206B and 206C, with no correction coefficient, in accordance with the following computing formula:

$$V1 - V2 = (VA + VB + VC)/3$$

The circuit operation for the above: The comparators 290 and 291 produce low level outputs. The comparators 286 and 287 produce high level outputs. The AND gate 296 produces a high level output. Other AND gates 294, 295, 297 to 299 and 400 to 402 produce low level outputs. The inverter 403 produces a high level output. This causes the output level of the OR gate 412 to become low and that of the NOR gate 425 to become high. The ope amp 226 produces a voltage (VA+VB+VC)/3. The output V1−V2 of the ope amp 231 also becomes (VA+VB+VC)/3.

(2-5)  $VP4 < \Delta BA < VP3$
       $\Delta CB < VQ4$

Figure 19I:
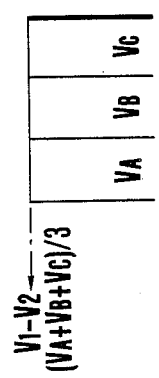
Figure 19F:
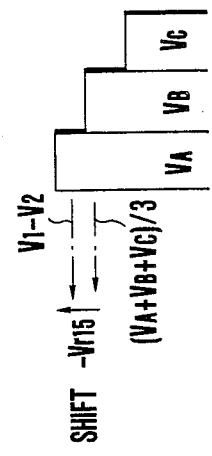
Figure 19H:
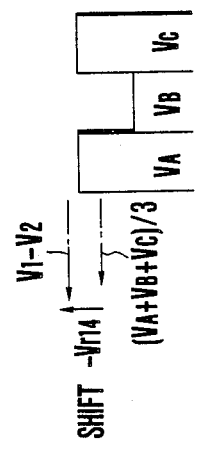
Figure 19E:
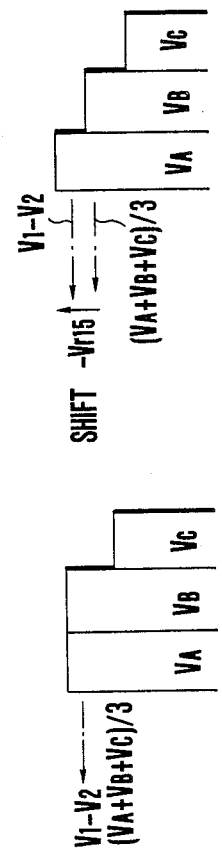

Referring to FIG. 19(e) which shows this condition, the difference ΔBA between the luminance signals for the areas 206A and 206B is small. The difference ΔCB between the luminance signals for the areas 206B and 206C is of a negative value and is larger than the given value VQ4 in absolute value. This suggests a case where the main object exists in both the areas 206A and 206B, which are alone illuminated. In this case, the measured light value may be obtained by using only the luminance values of the areas 206A and 206B. In the case of this embodiment, however, the area 206C which is a dark peripheral area is also taken into consideration. The measured light value V1−V2 is thus obtained by using not only the luminance values of the areas 206A and 206B but also that of the area 206C, without any correction coefficient, in accordance with the following computing formula:

$$V1 - V2 = (VA + VB + VC)/3$$

The circuit operation for the above is as follows: The comparators 286, 290 and 291 produce low level outputs. The comparator 287 produces a high level output. The AND gate 299 produces a high level while other AND gates 294 to 298 and 400 to 402 produce low level outputs. The inverter 403 produces a high level output. Therefore, the output level of the OR gate 412 becomes high. The output level of the NOR gate 425 also becomes high. The ope amp 226 of FIG. 13 produces a voltage (VA+VB+VC)/3. The output V1−V2 of the ope amp 231 also becomes (VA+VB+VC)/3.

(2-6)  $\Delta BA < VP4$
       $\Delta CB < VQ4$

This condition is as shown in FIG. 19(f). The difference ΔBA between the luminance signals for the areas 206A and 206B is of a negative value which is larger than the given value VP4 in absolute value. The difference ΔCB between the luminance signals for the areas 206B and 206C is also of a negative value larger than the given value VQ4 in absolute value. This suggests a case where the main object covers the whole of the area 206A and a part of the area 206B and where the area 206A and the part of the area 206B are illuminated by some light. In this case, unlike in the case of Para. (2-5) above, use of a correction coefficient is necessary for an exposure apposite to the main object part. The measured light value V1−V2 is therefore obtained by using the correction coefficient −Vr15, which is on the minus sign side, along with the luminance values of the areas 206A, 206B and 206C in accordance with the following computing formula:

$$V1-V2=(VA+VB+VC)/3+Vr15$$

The circuit operation for this is as follows: The comparators 286 to 291 all produce low level outputs. The AND gate 402 produces a high level output. Other AND gates 294 to 299, 400 and 401 produce low level outputs. The inverter 403 produces a high level output. This causes the output level of the OR gate 412 to become high and also that of the AND gate 423 to become high. Then, the ope amp 226 of FIG. 13 produces a voltage (VA+VB+VC)/3. The output V1−V2 becomes (VA+VB+VC)/3+Vr15.

(2-7) $\Delta BA < VP4$
$VQ4 < \Delta CB < VQ3$

Figure 19G:
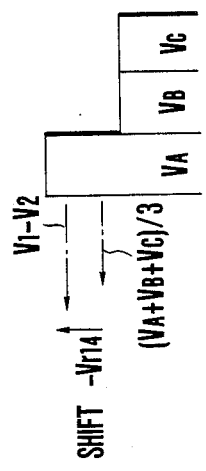

This condition is as shown in FIG. 19(g). The difference ΔBA between the luminance signals for the areas 206A and 206B is of a negative value larger than the given value VP4 in absolute value. The difference ΔCB between the luminance signals for the areas 206B and 206C is small. This suggests a case where the main object either covers the whole of the area 206A or is small covering only a part of the area 206A. In this case, for an exposure apposite to the main object part of the filed, the measured light value V1−V2 is obtained using the correction coefficient −Vr14, which is on the minus sign side, (|Vr14|>|Vr15|), along with the luminance values of the areas 206A, 206B and 206C in accordance with the following formula:

$$V1-V2=(VA+VB+VC)/3Vr14$$

The circuit operation for the above: The comparators 286, 287 and 291 produce low level outputs. The comparator 290 produces a high level output. The AND gate 402 produces a high level output. Other AND gates 294 to 299 and 400 to 402 produce low level outputs. The inverter 403 produces a high level output. Therefore, the output level of the OR gate 412 becomes high. Then, the OR gate 424 produces a high level output to render thereby the analog switch 434 conductive. This causes the ope amp 226 of FIG. 13 to produce a voltage (VA+VB+VC)/3. The output V1−V2 of the ope amp 231 then becomes (VA+VB+VC)/3+Vr14.

(2-8) $\Delta BA < VP4$
$VQ3 < \Delta CB$

The above condition is as shown in FIG. 19(h). The difference ΔBA between the luminance signals for the areas 206A and 206B is of a negative value larger than the given value VP4 in absolute value. The difference ΔCB between the luminance signals for the areas 206B and 206C is larger than the given value VQ3. This suggests a case where the main object is of about the same size as in the case of Para. (2-1) and is in a blackish color as a whole with varied degrees of brightness having a somewhat brighter part within the area 206A; or a landscape or the like having the area 206B occupied by an object of a considerably low degree of brightness. In such a case, according to data obtained in the past, a fairly good result is attainable by obtaining the measured light value V1−V2 by using all the luminance values of the areas 206A, 206B and 206C, without any correction coefficient, in accordance with a formula of V1−V2=(VA+VB+VC)/3, depending on the condition of the field. In the case of this embodiment, however, a method for attaining a good result in an overall aspect is employed. Namely, the measured light value is obtained by using the negative correction coefficient −Vr14 along with the luminance values of all the areas 206A, 206B and 206C in accordance with the following computing formula:

$$V1-V2=(VA+VB+VC)3+Vr14$$

The circuit operation for the above: The comparators 286 and 287 produce low level outputs. The comparators 290 and 291 produce high level outputs. The AND gate 400 produces a high level output. Other AND gates 294 to 299, 401 and 402 produce low level outputs. The inverter 403 produces a high level output. Therefore, the OR gate 412 produces a high level output. The OR gate 424 also produces a high level output. This causes the ope amp 226 of FIG. 13 to produce a voltage (VA+VB+VC)/3. The output V1−V2 of the ope amp then becomes (VA+VB+VC)/3+Vr14.

(2-9) $VP4 < \Delta BA < VP3$
$VQ4 < \Delta CB < VQ3$

FIG. 19(i) shows the above condition. The difference ΔBA between the luminance signals for the areas 206A and 206B is small. Another difference ΔCB between the luminance signals for the areas 206B and 206C is also small. This suggests a case where the whole field is occupied by the main object; or a landscape or the like having nothing in particular as a main object. In this instance, to have an exposure appropriate for all the areas 206A, 206B and 206C, the measured light value V1−V2 is obtained by using the luminance values of all the areas 206A, 206B and 206C, without any correction coefficient, in accordance with the following computing formula:

$$V1-V2=(VA+VB+VC)/3$$

The circuit operation for the above: The comparators 286 and 291 produce low level output. The comparator 287 and 290 produce high level outputs. The AND gate produces a high level output. Other AND gates 294 to 297, 299 and 400 to 402 produce low level outputs. The inverter 403 produces a high level output. Then, the output level of the OR gate 412 and that of the NOR gate 425 both become high. As a result, the ope amp 226 produces a voltage (VA+VB+VC)/3. The output V1−V2 of the ope amp 231 also becomes (VA+VB+VC)/3.

Figure 18B:
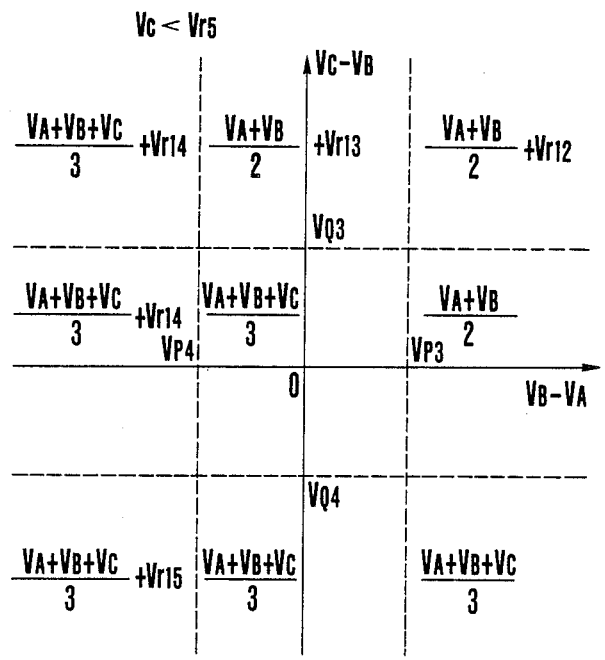

FIG. 18(b) shows the interrelation among the computing formulas (2-1) to (2-9) to be employed for the above stated varied luminance conditions.

The photometric device described as the second embodiment of this invention in the foregoing is characterized in that: With the main object assumed to be located in the middle part (or the area 206A) of the field, the size of the main object is detectable; and then the necessary correction can be accomplished in accordance with the detected size of the main object.

Referring to FIG. 13, if no information on the drop of peripheral image light quantity is transmitted, there would arise errors in the luminance values of the areas 206B and 206C1 to 206C4 of the light receiving element 206 to such degrees that correspond to the reference voltages Vvg1 and Vvg2 which are produced from the correction value producing circuit 301. In other words, scene discrimination is performed on the basis of the level of difference between the luminance values of adjacent areas. Therefore, an erroneous scene discrimination would results in an error of the computed photometric value V1−V2. Whereas, in the case of this embodiment, the reference voltage (a correction value) representing the degree of an image plane light quantity drop pertinent to the lens in use is obtained from the correction value producing circuit 301 when the lens is mounted in place of another; and the luminance value of the peripheral area of the image plane is corrected for the image plane light quantity drop by utilizing the reference voltage, so that the luminance of the field can be accurately measured for any part of the image plane. The embodiment is thus arranged to be capable of giving an exposure apposite to the main object located in the middle part.

Further, in the embodiment, when the average value of the luminance signals obtained from the small subdivided areas 206C1 to 206C4 of the outermost peripheral area 206C of the light receiving element 206 represents a high degree of luminance, the output of any of the small areas 206C1 to 206C4 that produces a low luminance signal is ignored, so that any element inadequate as a background luminance, such as a ground in the shadow under a clear sky, can be eliminated. Further, in case that the average value of the luminance signals obtained from these small areas 206C1 to 206C4 represent a low luminance degree, the output of any of them that produces a high luminance signal is ignored, so that any element inadequate for background luminance, such as an electric lamp light in a night scene can be eliminated.

Further, the photometric device of this embodiment is arranged such that: When the object to be photographed is detected to be whitish or blackish in color, the measured light is corrected with high-light control (for high-light depiction) or shadow control (for shadow depiction) in such a manner as to have the object photographed as a blackish object or as a whitish object as applicable. Besides, since the degree of such correction is changed according to the size of a main object, the measured light value is very effectively controlled.

Further, referring to FIGS. 18(a) to 19(i) which are used for the illustration of the embodiment described, the luminance level values of the areas 206A, 206B and 206C are shown as if they are at the same level in case that the luminance difference between adjacent areas is small. In actuality, there is of course some difference between the adjacent areas even when the difference between them is smaller than, for example, the given reference value VP1. In short, these drawings are nothing else but are mere illustrations intended to facilitate understanding of the arrangement of the embodiment. In this embodiment, the measured light V1−V2 are arranged to be computed by obtaining the luminance levels also from the outermost peripheral part which is subdivided into four parts (VC1 to VC4) of the image plane. However, this arrangement may be changed to obtain a measured light value either by subdividing the peripheral part into a greater number of parts or without subdividing the peripheral part (area). Further, the measured light computing operation is performed in one of two different manners, i.e. either by using the luminance value of the middle photometric area VA and that of the intermediate area VB or by using the luminance values of all the areas VA, VB and VC. However, this arrangement may be changed to likewise obtain a measured light value by always using either the luminance values of all the parts of the subdivided peripheral area or some of them for computation. Further, the field dividing arrangement of the embodiment may be changed to divide the field into three or more than three concentric areas and to use the luminance signal difference between adjacent concentric areas.

While the selection circuit 221 of this embodiment is composed of logic circuits, the scope of this invention is not limited to this but, of course, includes also the use of a microcomputer for the same purpose.

In the embodiment described, the area 206A corresponds to a middle part while the area 206B and the areas 206C1 to 206C4 correspond to peripheral areas respectively. In FIG. 13, the resistors 321 to 340, ope amps 341 to 345 and the circuit elements from the peripheral luminance value computing circuit 220 to the ope amp 231 jointly form computing means. Further, the reference voltages Vvg1 and Vvg2 represent correction value information obtained from the photo taking lens.

The second embodiment which is arranged as described in the foregoing is provided with computing means for computing a photometric (or measured light) value not only on the basis of information about the luminance of the middle and peripheral areas of the light receiving means but also on the basis of correction value representing an image plane light quantity drop which pertains to a specific photo taking lens in use and is supplied from the lens. The embodiment is thus arranged to correct the measured light value for the image plane light quantity drop that intrinsically pertains to each of the interchangeable photo taking lenses. The photometric device according to this invention is therefore capable of always accurately performing photometric operations without any photometric error that otherwise would arise every time one lens is replaced with another.

What is claimed is:

1. A photometric device for a single-lens reflex camera having a viewfinder, a pentagonal prism, and an interchangeable lens, said device comprising:

(a) light receiving means having a middle area photosensor which measures the luminance of the middle area of a photographing field and a plurality of peripheral area photosensors which measure the luminance of peripheral areas of the field, said light receiving means producing luminance information from each of the peripheral areas, said photosensors being disposed at a position off of an optical axis of said viewfinder wherein said middle area photosensor in said light receiving means is eccentrically deviated from the optical axis of said viewfinder;

(b) a photometric optical system which includes a focusing screen, and an image forming lens arranged to guide an image of a photograph object formed on said focusing screen, said optical system being disposed in the rear of an exit face of said pentagonal prism in an eccentric position deviating from the optical axis of said viewfinder;

(c) computing means for computing a measured light value on the basis of information on the luminance of each of the areas of said light receiving means;

(d) information receiving means for receiving, from the interchangeable lens, information pertaining to an exit pupil position of said interchangeable lens; and (e) correction means for supplying said computing means with correction information for correcting the luminance information obtained from a specific one of the peripheral areas on the basis of the information obtained by said information receiving means, the correction information being based on the fact that the middle area of said light receiving means is eccentrically deviated from the optical axis of said viewfinder.

2. A device according to claim 1, wherein the information receiving means is arranged to receive said information on the exit pupil position from said interchangeable lens in the form of an electrical signal.

3. A device according to claim 1, further comprising second information receiving means for receiving information on the F-number of said interchangeable lens; and second correction means which is arranged to supply said computing means with second correction information for correcting luminance information on the basis of information obtained by said second information receiving means.

4. A device according to claim 3, wherein said second correction means is arranged to correct luminance information produced by said light receiving means.

5. A photometric device for a single-lens reflex camera having a viewfinder, a pentagonal prism, and an interchangeable lens, said device comprising:

(a) light receiving means having a middle area photosensor which measures the luminance of the middle area of a photographing field and a plurality of peripheral area photosensors which measure the luminance of peripheral areas of the field, said light receiving means producing luminance information from each of the peripheral areas, said photosensors being disposed at a position off of an optical axis of the camera wherein said middle area photosensor in said light receiving means is eccentrically deviated from the optical axis of said viewfinder;

(b) a photometric optical system having an image forming lens which is arranged to guide a formed image of an object to said photosensors, said optical system being disposed in an eccentric position deviating from the optical axis of the light of the object;

(c) computing means for computing a measured light value on the basis of the luminance information of each of the peripheral areas of said light receiving means;

(d) information receiving means adapted for receiving, from said interchangeable lens, information pertaining to an exit pupil position of said interchangeable lens; and (e) correction means for supplying said computing means with correction information for correcting the luminance information obtained from a specific one of the areas on the basis of said information obtained by said information receiving means, the correction information being based on the fact that the middle area of said light receiving means is eccentrically deviated from the optical axis of said viewfinder.

6. A photometric device for a camera of the kind using an interchangeable lens, said photometric device comprising:

(a) said interchangeable lens comprising:
 (i) memory means for storing information of a correction value representing a drop in a peripheral light amount and for outputting the information as an electrical signal; and (b) a camera body comprising:
 (i) light receiving means having a middle area photosensor which is arranged to measure the luminance of the middle area of a photographing field, and a peripheral area photosensor which is arranged to measure the luminance of the peripheral areas of the field, said light receiving means being arranged to produce luminance information on each of the peripheral areas; and
 (ii) computing means for computing the measured light value of the field on the basis of the luminance information obtained from said light receiving means for each of the areas and the correction value information obtained from said memory means.

7. A photometric device for a camera according to claim 6, wherein the peripheral area is further divided into plural areas.

8. A photometric device for a camera according to claim 6, wherein the camera body and the interchangeable lens are connected by a contact member.

9. An interchangeable lens attachable to a camera body having light receiving means which is provided with a middle area photosensor for measuring the luminance of the middle area of a photographing field and a peripheral area photosensor for measuring the luminance of the peripheral area of the field and is arranged to produce luminance information obtained from each of the areas, and computing means which is arranged to compute the measured light value of the field on the basis of the luminance information obtained from said light receiving means for each of the areas and a correction value information representing a drop in image plane light quantity, said interchangeable lens comprising:

(a) storing means arranged to store the correction value information representing the drop in the peripheral light quantity, and to allow the correction value information to be supplied in the form of an electrical signal to the camera body when said interchangeable lens is mounted on the camera body; and (b) a lens optical system.

10. An interchangeable lens according to claim 9, wherein the peripheral area is further divided into plural areas.

11. An interchangeable lens according to claim 9, wherein the camera body and the interchangeable lens are connected by a contact member.

12. A single-lens reflex camera system having a photometric device including a viewfinder, a pentagonal prism, and an interchangeable lens, said camera system comprising:

(a) a camera body including:
 (i) light receiving means having a middle area photosensor which measures the luminance of the middle area of a photographing field and a plurality of peripheral area photosensors which measure the luminance of peripheral areas of the field, said light receiving means producing luminance information from each of the peripheral areas, said photosensors being disposed at a position off of an optical axis of the camera wherein said middle area photosensor in said light receiving means is eccentrically deviated from the optical axis of said viewfinder;
 (ii) a photometric optical system having an image forming lens which is arranged to guide a formed image of an object to said photosensors, said optical system being disposed in an eccentric position deviating from the optical axis of the light of the object;
 (iii) computing means for computing a measured light value on the basis of information on the luminance of each of the peripheral areas of said light receiving means;
 (iv) information receiving means for receiving, from said interchangeable lens, information pertaining to an exit pupil position of said interchangeable lens; and
 (v) correction means for supplying said computing means with correction information for correcting the luminance information obtained from a specific one of the peripheral areas on the basis of the information obtained by said information receiving means, the correction information being based on the fact that the middle area of said light receiving means in eccentrically deviated from the optical axis of said viewfinder; and (b) said interchangeable lens being attachable to and detachable from said camera body and including:
 (i) means for storing the information pertaining to the exit pupil position of said interchangeable lens; and
 (ii) means for supplying the information pertaining to the exit pupil position to said camera body.

13. An interchangeable lens attachable to and detachable from a camera body having a photometric device including light receiving means having a middle area photosensor which measures the luminance of the middle area of a photographing field and a plurality of peripheral area photosensors which measure the luminance of a peripheral area of the field, said light receiving means producing luminance information from each of the areas, said light receiving means being arranged to generate information on the luminance degrees of the areas separately from each other, wherein said middle area photosensor in said light receiving means is eccentrically deviated from the optical axis of a viewfinder, a photometric optical system having an image forming lens which is arranged to guide a formed image of an object to said plurality of photosensors, said optical system being disposed in an eccentric position deviating from the optical axis of the light object, computing means for computing a measured light value on the basis of information on the luminance of each of the areas of said light receiving means, information receiving means for receiving, from an interchangeable lens, information pertaining to an exit pupil position of said interchangeable lens, and correction means for supplying said computer means with correction information for correcting the luminance information obtained from a specific one of the areas on the basis of the information obtained by said information receiving means, the correction information being based on the fact that the middle area of said light receiving means is eccentrically deviated from the optical axis of the viewfinder, said interchangeable lens comprising:

(a) means for storing the information pertaining to the exit pupil position of said interchangeable lens; and (b) means for supplying the information pertaining to the exit pupil position to the camera body.

14. A single-lens reflect camera system having a photometric device, said camera system comprising:

(a) an interchangeable lens comprising means for holding information representing an exit pupil position of said interchangeable lens and for outputting the information as an electrical signal; and (b) a camera body comprising:
 (i) a viewfinder;
 (ii) a pentagonal prism;
 (iii) light receiving means having a middle area photosensor which measures the luminance of the middle area of a photographing field and a plurality of peripheral area photosensors which measure the luminance of the peripheral areas of the field, said light receiving means producing luminance information from each of the areas, said photosensors being disposed at a position off of an optical axis of said viewfinder wherein said middle area photosensor in said light receiving means is eccentrically deviated from the optical axis of said viewfinder;
 (iv) a photometric optical system which includes a focusing screen, and an image forming lens arranged to guide an image of a photographed object formed on said focusing screen, said optical system being disposed in the rear of an exit face of said pentagonal prism in an eccentric position deviating from the optical axis of said viewfinder;
 (v) computing means for computing a measured light value on the basis of the luminance information of each of the areas of said light receiving means;
 (vi) information receiving means for receiving from said interchangeable lens information pertaining to the exit pupil position; and
 (vii) correction means for supplying said computer means with correction information for correcting the luminance information on the basis of the information obtained by said information receiving means, the correction information being based on the fact that the middle area of said light receiving means is eccentrically deviated from the optical axis of said viewfinder.

15. A camera system according to claim 14, wherein said interchangeable lens comprises means for holding the information pertaining to an F-number of said interchangeable lens; and further comprising means for outputting the information as an electrical signal.

16. A camera system according to claim 15, wherein said correction means is arranged to supply said computer means with the correction information for correcting the luminance information, the correction information pertaining to information pertaining to the exit pupil position and information pertaining to the F-number.

17. An interchangeable lens attachable to and detachable from a camera body which includes a viewfinder, a pentagonal prism, light receiving means which is provided with a middle area photosensor for measuring the luminance of the middle area of a photographing field and a peripheral area photosensor for measuring the luminance of the peripheral area of the field and is arranged to produce luminance information obtained from each of the areas, and a photometric optical system which includes a focusing screen and an image forming lens arranged to guide an image of a photographed object formed on said focusing screen, said optical system being disposed in the rear of an exit face of the pentagonal prism in an eccentric position deviating from the optical axis of said viewfinder, and computing means which is arranged to compute the measured light value of the field on the basis of the luminance information obtained from said light receiving means for each of the areas and correction information related to an exit pupil position of said interchangeable lens, said interchangeable lens comprising:
  (a) means for holding the correction information pertaining to the exit pupil position of said interchangeable lens and for outputting the correction information as an electrical signal; and
  (b) an optical lens system.

18. An interchangeable lens according to claim 17, wherein the peripheral area is further divided into plural areas.

19. An interchangeable leans according to claim 17, wherein said interchangeable means and said camera body are connected by a contact member.

20. A camera system having a photometric device, said camera system comprising:
  (a) an interchangeable lens comprising:
    (i) means for holding information of a correction value representing a drop in a peripheral light amount and for outputting the information as an electrical signal; and
  (b) a camera body comprising:
    (i) a light receiving means having a middle area photosensor which is arranged to measure the luminance of the middle area of a photographing field, and a peripheral area photosensor which is arranged to measure the luminance of the peripheral area of the field, said light receiving means being arranged to produce luminance information for each of the areas; and
    (ii) computing means for computing the measured light value of the field on the basis of the luminance information obtained from said light receiving means for each of the areas and the correction value information obtained from said memory means.

21. A camera system according to claim 20, wherein the peripheral area is further divided into plural areas.

22. A camera system according to claim 20, wherein said interchangeable lens and said camera body are connected by a contact member.

23. An interchangeable lens attachable to a camera body which includes light receiving means which is provided with a middle area photosensor for measuring the luminance of the middle area of a photographing field and a peripheral area photosensor for measuring the luminance of the peripheral area of the field and is arranged to produce luminance information obtained from each of the areas, and computing means which is arranged to compute the measured light value of the field on the basis of the luminance information obtained from said light receiving means for each of the areas and correction value information representing a drop in image plane light quantity, said interchangeable lens comprising:
  (a) means for holding the correction value information representing the drop in the peripheral light amount and for outputting the correction value information as an electrical signal when said lens is mounted on said camera body; and
  (b) a lens optical system.

24. An interchangeable lens according to claim 23, wherein the peripheral area is further divided into plural areas.

25. An interchangeable lens according to claim 23, wherein the camera body and the interchangeable lens are connected by a contact member.

* * * * *

UNITED STATES PATENT AND TRADEMARK OFFICE
CERTIFICATE OF CORRECTION

PATENT NO. : 4,985,726
DATED : January 15, 1991
INVENTOR(S) : Fujibayashi, et al.

It is certified that error appears in the above-identified patent and that said Letters Patent is hereby corrected as shown below:

On the title page: Item [75]:

"Shuchi Kiyohara," should read --Shuichi Kiyohara,--.

COLUMN 3:

Line 27, "area" should read --areas--.
Line 41, "lens," should read --lenses,--.

COLUMN 6:

Line 55, "sows" should read --shows--.

COLUMN 7:

Line 10, "assumably" should read --assembly--.

COLUMN 8:

Line 18, "of" should be deleted.

COLUMN 10:

Line 13, "VA." should read --VA,--.

COLUMN 11:

Line 4, "negative-pase" should read --negative-phase--.

UNITED STATES PATENT AND TRADEMARK OFFICE
CERTIFICATE OF CORRECTION

PATENT NO. : 4,985,726

DATED : January 15, 1991

INVENTOR(S) : Fujibayashi, et al.

It is certified that error appears in the above-identified patent and that said Letters Patent is hereby corrected as shown below:

COLUMN 12:

Line 33, "$Vr1 \geq Vr2 \geq Vr3 \geq Vr4.$" should read --$Vr1 > Vr2 > Vr3 > Vr4.$--.

COLUMN 13:

Line 40, "cannot" should read --can--; and "therefore" should read --therefore,--.

COLUMN 15:

Line 25, "vol&age" should read --voltage--.

COLUMN 16:

Line 28, "Vr," should read --Vr8,--.
    Line 44, "respectively" should read --respectively.--.

COLUMN 21:

Line 60, "(VA+VB+BC)/3-Vr10." should read --(VA+VB+VC)/3-Vr10.--.

COLUMN 22:

Line 27, "(VA+VB+VC)/3Vr11." should read --(VA+VB+VC)/3-Vr11.--.

UNITED STATES PATENT AND TRADEMARK OFFICE
CERTIFICATE OF CORRECTION

PATENT NO. : 4,985,726          Page 3 of 4

DATED : January 15, 1991

INVENTOR(S) : Fujibayashi, et al.

It is certified that error appears in the above-identified patent and that said Letters Patent is hereby corrected as shown below:

COLUMN 23:

Line 34, "VA+VB)/2." should read --(VA+VB)/2.--.
    Line 65, "become" should read --becomes--.

COLUMN 24:

Line 10, "VQ3)" should read --<VQ3--.

COLUMN 26:

Line 56, "high level" should read --high level output--.

COLUMN 27:

Line 47, "filed," should read --field,--.
    Line 53, "V1-V2=(VA+VB+VC)/3Vr14" should read --V1-V2=(VA+VB+VC)/3+Vr14--.

COLUMN 28:

Line 66, "comparator" should read --comparators--.

COLUMN 31

Line 36, "the" should read --said--.
    Line 37, "said" should read --the--.

UNITED STATES PATENT AND TRADEMARK OFFICE
CERTIFICATE OF CORRECTION

PATENT NO. : 4,985,726  Page 4 of 4
DATED : January 15, 1991
INVENTOR(S) : Fujibayashi, et al.

It is certified that error appears in the above-identified patent and that said Letters Patent is hereby corrected as shown below:

COLUMN 33

Line 48, "in" should read --is--.

COLUMN 34:

Line 61, "computer" should read --computing--.

COLUMN 35:

Line 8, "puter" should read --puting--.

Line 42, "interchangeable leans" should read --interchangeable lens--.

Line 43, "interchangeable means" should read --interchangeable lens--.

Signed and Sealed this

Twenty-seventh Day of April, 1993

*Attest:*

MICHAEL K. KIRK

*Attesting Officer*  Acting Commissioner of Patents and Trademarks